US012642337B2

(12) United States Patent
Kim et al.

(10) Patent No.: US 12,642,337 B2
(45) Date of Patent: Jun. 2, 2026

(54) SUPPORTING COVER FOR ELECTRONIC DEVICE

(71) Applicant: Samsung Electronics Co., Ltd., Suwon-si (KR)

(72) Inventors: Iksang Kim, Suwon-si (KR); Jinsun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 93 days.

(21) Appl. No.: 18/488,527

(22) Filed: Oct. 17, 2023

(65) Prior Publication Data

US 2024/0122320 A1     Apr. 18, 2024

Related U.S. Application Data

(63) Continuation of application No. PCT/KR2023/016001, filed on Oct. 17, 2023.

(30) Foreign Application Priority Data

Oct. 17, 2022    (KR) ........................ 10-2022-0132976
Nov. 8, 2022    (KR) ........................ 10-2022-0148004

(51) Int. Cl.
*A45C 11/00*        (2006.01)
*G06F 1/16*        (2006.01)

(52) U.S. Cl.
CPC ............ *A45C 11/00* (2013.01); *G06F 1/1656* (2013.01); *A45C 11/002* (2025.01); *A45C 11/003* (2025.01); *A45C 2200/15* (2013.01)

(58) Field of Classification Search
CPC ..... A45C 11/00; A45C 11/002; A45C 11/003; A45C 2200/15; G06F 1/1656
See application file for complete search history.

(56) References Cited

U.S. PATENT DOCUMENTS 8,138,869 B1 *    3/2012  Lauder .................. G06F 1/1615
                                                     335/304
8,640,864 B2 *    2/2014  Chen ..................... G06F 1/1626
                                                     206/320

(Continued)

FOREIGN PATENT DOCUMENTS

KR       10-2003-0031250       4/2003
KR          20090067126 A      6/2009

(Continued)

OTHER PUBLICATIONS

Search Report and Written Opinion dated Jan. 23, 2024 issued in International Patent Application No. PCT/KR2023/016001.

*Primary Examiner* — Eret C McNichols
(74) *Attorney, Agent, or Firm* — Nixon & Vanderhye, P.C.

(57)            ABSTRACT
According to an embodiment of the disclosure, a support cover of an electronic device may include: a first main area; a second main connected to be rotatable relative to the first main area; a first sub area connected to be rotatable relative to the second main area; a second sub area a connected to be rotatable relative to the first sub area and having a length greater than a length of the first sub area in a first direction; at least one connector disposed on the second sub area and configured to be fixed to at least a part of the electronic device; and a first protrusion portion disposed adjacent to the first sub area and protruding from the second sub area.

19 Claims, 23 Drawing Sheets

(56) References Cited

U.S. PATENT DOCUMENTS

| 8,820,695 | B2 * | 9/2014 | Nakada | G06F 1/1626 |
| | | | | 248/455 |
| 8,875,879 | B2 * | 11/2014 | Diebel | B65D 85/00 |
| | | | | 206/45.24 |
| 9,000,871 | B2 * | 4/2015 | Cencioni | G06F 1/1626 |
| | | | | 439/38 |
| 9,266,641 | B2 * | 2/2016 | Quehl | H04M 1/04 |
| 9,310,835 | B2 * | 4/2016 | Bryan | G06F 1/1626 |
| 9,489,015 | B2 * | 11/2016 | Gioscia | A45C 11/00 |
| 9,540,134 | B2 * | 1/2017 | Melmon | B65D 5/5206 |
| 9,758,274 | B2 * | 9/2017 | Melmon | B65D 5/5206 |
| 10,078,346 | B2 * | 9/2018 | Lay | F16M 11/38 |
| 10,114,410 | B2 * | 10/2018 | Ke | G06F 1/1618 |
| 10,159,319 | B2 * | 12/2018 | Sirichai | H05K 5/0234 |
| 10,211,874 | B2 * | 2/2019 | Kao | A45C 13/1069 |
| 10,231,043 | B2 * | 3/2019 | Hemesath | A45C 13/1069 |
| 10,716,376 | B2 * | 7/2020 | Buechin | A45C 11/00 |
| 11,184,989 | B2 * | 11/2021 | Kang | G06F 3/039 |
| 11,209,870 | B1 * | 12/2021 | Li | F16M 11/10 |
| 11,513,556 | B2 * | 11/2022 | Stryker | G06F 1/1626 |
| 11,774,037 | B2 * | 10/2023 | Ng | F16M 11/38 |
| | | | | 248/558 |
| 11,839,295 | B2 * | 12/2023 | He | A47B 23/043 |
| 2009/0159763 | A1 | 6/2009 | Kim | |
| 2013/0140203 | A1 * | 6/2013 | Chiang | G06F 1/1628 |
| | | | | 206/320 |
| 2013/0328825 | A1 * | 12/2013 | Brown | G01B 7/30 |
| | | | | 345/174 |
| 2013/0328917 | A1 * | 12/2013 | Zambetti | G06F 1/1626 |
| | | | | 345/620 |
| 2014/0284228 | A1 * | 9/2014 | Chiou | G06F 1/1632 |
| | | | | 206/320 |
| 2015/0049426 | A1 * | 2/2015 | Smith | G06F 1/1681 |
| | | | | 220/230 |
| 2015/0263776 | A1 * | 9/2015 | Shyu | A45C 13/002 |
| | | | | 455/575.8 |
| 2016/0026218 | A1 * | 1/2016 | Jefferies | A45C 13/005 |
| | | | | 455/575.8 |
| 2016/0066667 | A1 | 3/2016 | Yu et al. | |
| 2016/0377220 | A1 * | 12/2016 | Lin | F16M 11/10 |
| | | | | 248/176.3 |
| 2017/0070001 | A1 * | 3/2017 | Degner | H01R 13/6315 |
| 2018/0168303 | A1 | 6/2018 | Marks | |
| 2021/0037666 | A1 | 2/2021 | Kang et al. | |
| 2022/0236771 | A1 | 7/2022 | Lee et al. | |
| 2024/0374001 | A1 * | 11/2024 | Cho | A45C 11/00 |

FOREIGN PATENT DOCUMENTS

| KR | 10-1243217 | 3/2013 |
| KR | 20140051533 A | 5/2014 |
| KR | 20140146466 A | 12/2014 |
| KR | 20210016236 A | 2/2021 |
| KR | 20210062276 A | 5/2021 |
| KR | 20210089106 A | 7/2021 |

* cited by examiner

SUPPORTING COVER FOR ELECTRONIC DEVICE

CROSS-REFERENCE TO RELATED APPLICATIONS

This application is a continuation of International Application No. PCT/KR2023/016001 designating the United States, filed on Oct. 17, 2023, in the Korean Intellectual Property Office and claiming priority to Korean Patent Application Nos. 10-2022-0132976, filed on Oct. 17, 2022, and 10-2022-0148004, filed on Nov. 8, 2022, in the Korean Intellectual Property Office, the disclosures of all of which are incorporated by reference herein in their entireties.

BACKGROUND

Field

The disclosure relates to a support cover and, for example, relates to an electronic device support cover configured to provide a support structure with regard to various use environments.

Description of Related Art

Electronic devices may refer to devices configured to perform specific functions according to installed programs, such as home appliances, electronic wallets, portable multimedia players, mobile communication terminals, tablet PCs, video/audio devices, desktop/laptop computers, and vehicle navigation systems. For example, such electronic devices may output stored information as sounds or images. In addition, electronic devices to be carried, for example, laptop computers, tablet PCs, electronic wallets, portable multimedia players, and mobile communication terminals, generally include a display device and a battery.

Such electronic devices have various kinds of input devices. For example, an electronic device such as a desktop computer has an input device such as a keyboard or a mouse, and a home appliance is provided with a remote control. Keypads have been used as traditional input devices of electronic devices such as mobile communication terminals, and a laptop computer may have a touch pad and a keypad provided instead of the mouse and integrated with the housing of the laptop computer.

As mobile computing devices such as laptops, smartphones, or tablet PCs are widely used, and as the new produce replacement cycle is shortened, there have been increasing demands for protecting the exterior of the computing devices or personalizing the appearance through other decorations.

Particularly, a laptop computer has larger size and weight than a smartphone or a tablet PC, and thus needs to be carried and stored in a separate bag, not in hand or pocket.

Many users utilize a case, pouch, or bag type peripheral device for a laptop computer to protect the laptop computer, when placed in a bag, against friction with other objects in the bag, external pressures applied to the bag, or impacts occurring when the bag falls.

SUMMARY

According to an example embodiment of the disclosure, a support cover of an electronic device may include: a first main area; a second main area connected to be rotatable relative to the first main area; a first sub area connected to be rotatable relative to the second main area; a second sub area connected to be rotatable relative to the first sub area and having a length greater than a length of the first sub area in a first direction; at least one connector disposed on the second sub area and configured to be fixed to at least a part of the electronic device; and a first protrusion portion disposed adjacent to the first sub area and protruding from the second sub area.

According to an example embodiment of the disclosure, a support cover of an electronic device may include: a first main area including a first first main area and a second first main area connected to be rotatable relative to the first first main area; a second main area including a first second main area connected to be rotatable relative to the second first main area and a second second main area connected to be rotatable relative to the first second main area; a first sub area connected to be rotatable relative to the second second main area; a second sub area connected to be rotatable relative to the first sub area and including a first protrusion portion protruding from at least a part thereof; and at least one connector disposed on the second sub area and configured to be fixed to at least a part of the electronic device.

According to an example embodiment of the disclosure, a support cover of an electronic device may include: a first main area including a first first main area and a second first main area connected to be rotatable relative to the first first main area; a second main area including a first second main area connected to be rotatable relative to the second first main area and a second second main area connected to be rotatable relative to the first second main area; a first sub area connected to be rotatable relative to the second second main area and including a first protrusion portion protruding from at least a part thereof; a second sub area connected to be rotatable relative to the first sub area; and a third sub area connected to be rotatable relative to the second sub area.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
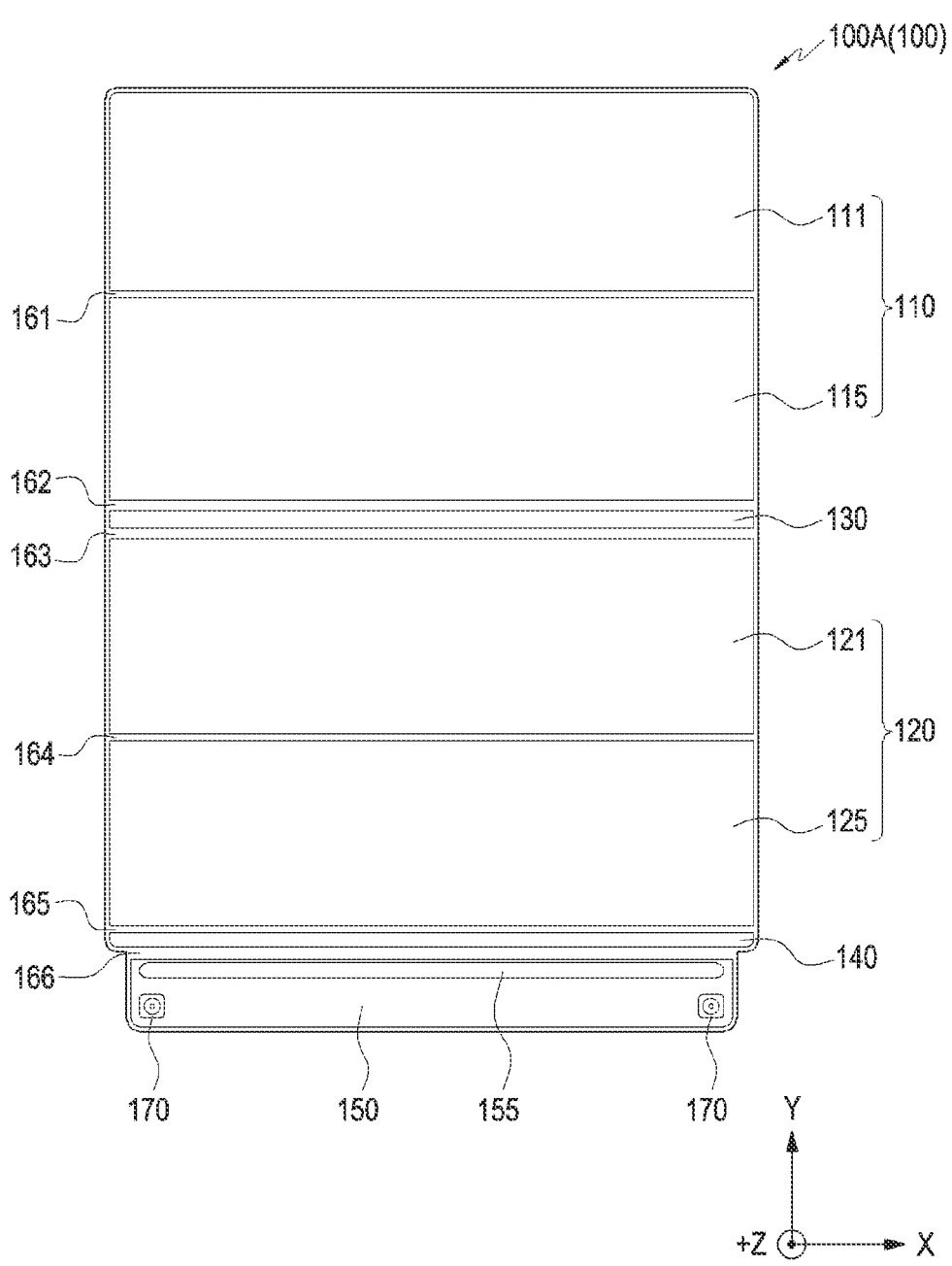
FIG. 1A is a diagram illustrating front view of a front surface of a support cover of an electronic device according various embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 1B:
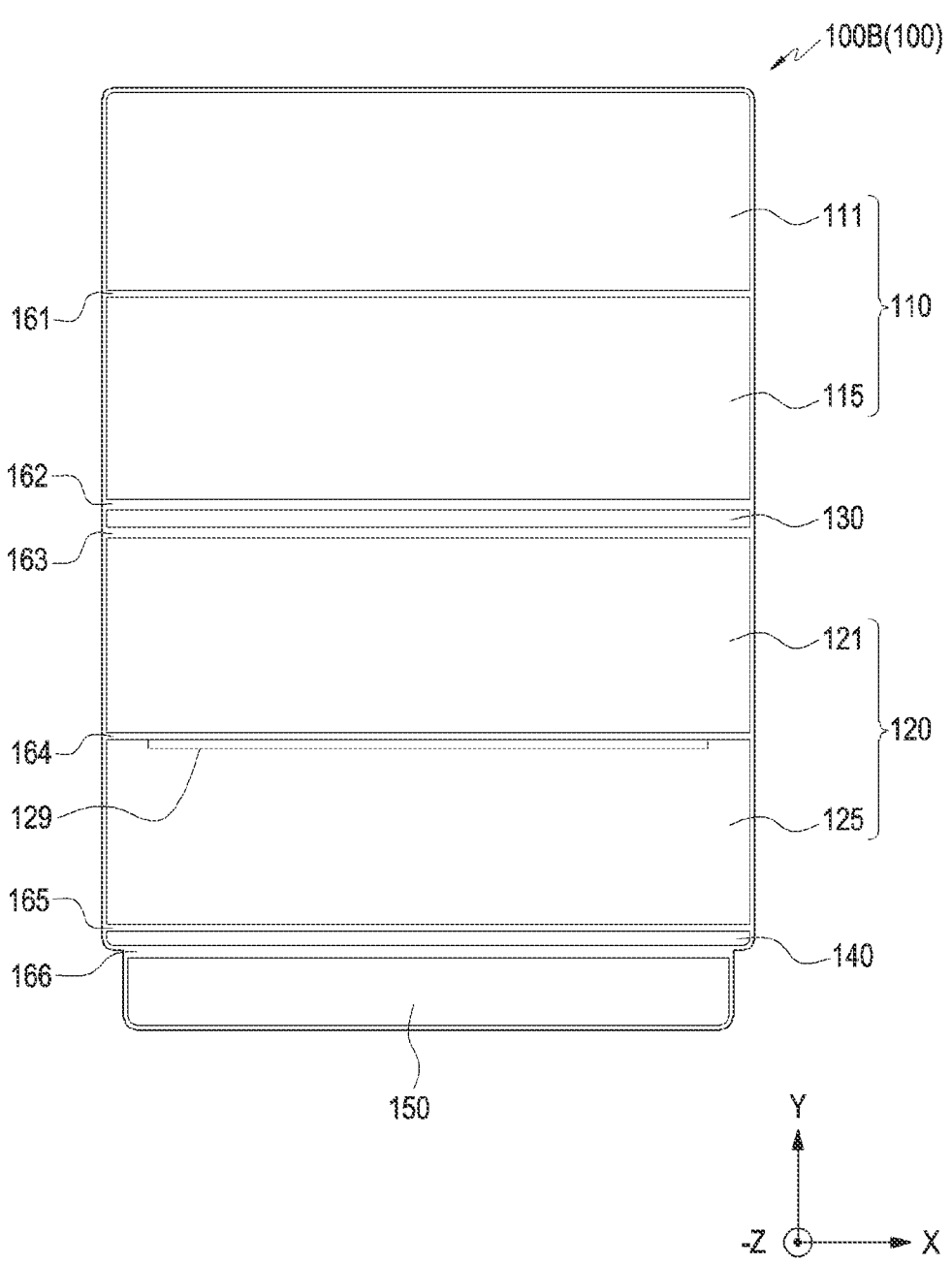
FIG. 1B is a diagram illustrating a rear view of a rear surface of a support cover of an electronic device according various embodiments.

FIG. 1A is a diagram illustrating a front view of a front surface 100A of a support cover 100 of an electronic device 10 according various embodiments. FIG. 1B is a diagram illustrating a rear view 100B of a rear surface of a support cover 100 of an electronic device 10 according various embodiments.

Embodiments of FIGS. 1A to 1B may be coupled to embodiments illustrated by way of non-limiting example in FIGS. 2 to 13C, but is not limited thereto.

According to an embodiment, the support cover 100 of the electronic device 10 (e.g., electronic device 10 of FIG. 5A) may include a plurality of areas and a plurality of rotation axes. Each of the plurality of areas of the support cover 100 may be rotatably connected to other areas adjacent thereto by means of the rotation axes, respectively.

FIG. 1A is a view illustrating a front surface 100A of the support cover 100. FIG. 1B is a view illustrating a rear surface 100B of the support cover 100, and illustrates the support cover 100 viewed in a direction opposite to FIG. 1A. FIG. 1A and FIG. 1B illustrate the support cover 100 in an unfolded state.

According to an embodiment, the plurality of areas of the support cover 100 may be folded or unfolded with reference to a plurality of rotation axes at various angles, so that various mounting structures with respect to the electronic device 10 may be provided.

According to an embodiment, the electronic device 10 covered or supported by the support cover 100 may include a first housing (e.g., a first housing 11 of FIG. 5B) and a second housing (e.g., a second housing 15 of FIG. 5B) disposed to be rotatable relative to the first housing. A display module (or display panel) may be disposed in the first housing of the electronic device. The first housing may be referred to as a display housing. The display module may include a digitizer configured to detect input of a digital pen (e.g., stylus pen). Keyboard buttons and a touch pad may be disposed in the second housing of the electronic device. The second housing may be referred to as a keyboard housing. The first housing and the second housing may be rotatably connected to each other by means of a hinge structure. Hereinafter, for convenience of explanation, a surface on which a display of the first housing is disposed is referred to as a front surface of the first housing, a surface opposite thereto is referred to as a rear surface of the first housing, a surface on which keyboard buttons and a touch pad of the second housing are disposed is referred to as a front surface of the second housing, and a surface opposite thereto is referred to as a rear surface of the second housing.

According to an embodiment, the front surface of the first housing may be disposed to face the front surface of the second housing, and at this time, an angle formed by the first housing and the second housing may be defined as 0 degrees or an angle closer to 0 degrees. According to an embodiment, the rear surface of the first housing may be disposed to face the rear surface of the second housing, and an angle formed by the first housing and the second housing may be defined as 360 degrees or an angle closer to 360 degrees.

According to an embodiment, the support cover 100 may include at least one of a first main area 110, a second main area 120, a third main area 130, a first sub area 140, a second sub area 150 or at least one connector 170. For example, the areas may be referred to as various terms such as elements, components, panels, or structures of the support cover 100.

In addition, the support cover 100 may include at least one of a first rotation axis 161, a second rotation axis 162, a third rotation axis 163, a fourth rotation axis 164, a fifth rotation axis 165 or a sixth rotation axis 166. For example, the rotation axes may be referred to as various terms such as rotation areas, rotation elements, or folding areas.

Figure 4A:
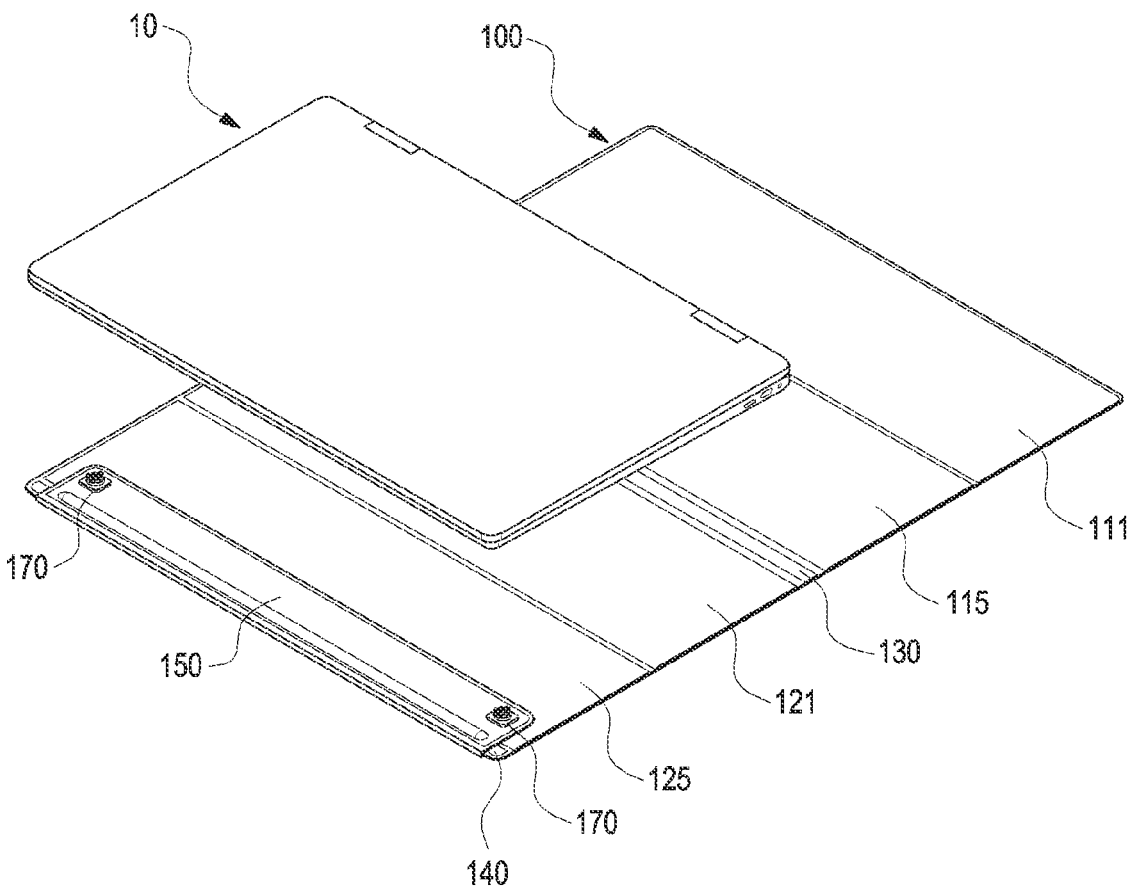
FIG. 4A is a perspective view illustrating a state in which an electronic device and a support cover are separated according to various embodiments.
Figure 4B:
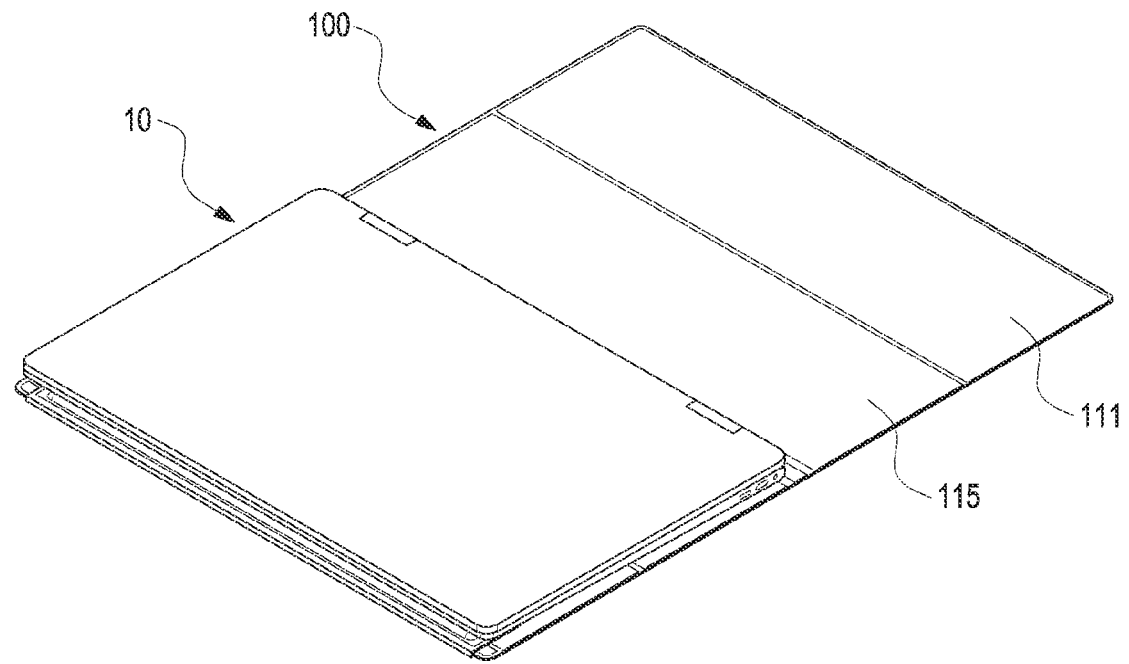
FIG. 4B is a perspective view illustrating a state in which an electronic device and a support cover are coupled according to various embodiments.
Figure 4C:
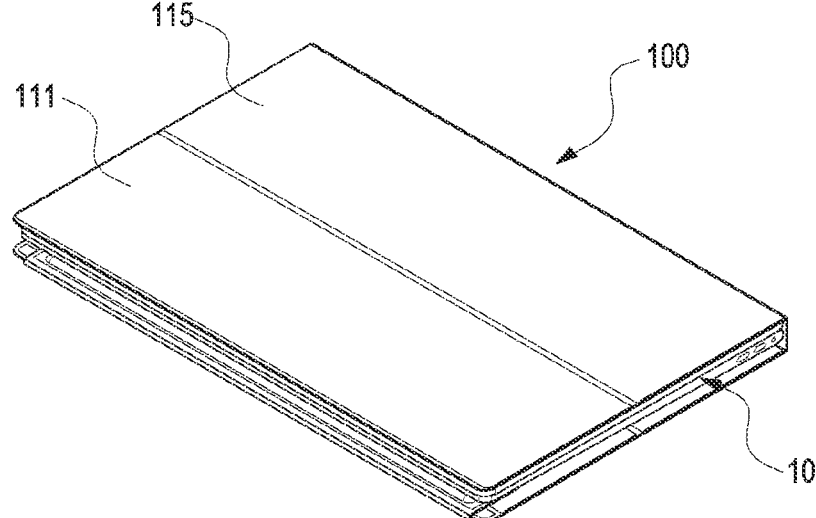
FIG. 4C is a perspective view illustrating a first state of a support cover supporting an electronic device according to various embodiments.

According to an embodiment, the first main area 110 may be an area covering the first housing 11 of the electronic device 10 when a support structure is in a first state (refer, e.g., to FIG. 4C).

According to an embodiment, the first main area 110 may include a (1-1)th main area 111 and a (1-2)th main area 115. The (1-2)th main area 115 may be connected to the (1-1)th main area 111 through the first rotation shaft 161. For example, the (1-2)th main area 115 may rotate relative to the (1-1)th main area 111 with reference to the first rotation axis 161. In addition, the (1-2)th main area 115 may be disposed to form a predetermined angle with the (1-1)th main area 111 with reference to the first rotation axis 161, or may be disposed to form an angle of 180 degrees with the (1-1)th main area 111.

According to an embodiment, the first rotation axis 161 may be made of a flexible material so that the (1-1)th main area 111 and the (1-2)th main area 115 are rotatable relative to each other.

According to an embodiment, the second main area 120 may be an area covering the second housing 15 of the electronic device 10 when a support structure is in a first state (refer, e.g., to FIG. 4C).

According to an embodiment, the second main area 120 may include a (2-1)th main area 121 and a (2-2)th main area 125. The (2-2)th main area 125 may be connected to the (2-1)th main area 121 through the fourth rotation axis 164. For example, the (2-2)th main area 125 may rotate relative to the (2-1)th main area 121 with reference to the fourth rotation axis 164. In addition, the (2-2)th main area 125 may be disposed to form a predetermined angle with the (2-1)th main area 121 with reference to the fourth rotation axis 164 or disposed to form an angle of 180 degrees with the (2-1)th main area 121.

According to an embodiment, the fourth rotation axis 164 may be made of a flexible material so that the (2-1)th main area 121 and the (2-2)th main area 125 are rotatable relative to each other.

According to an embodiment, the third main area 130 may be disposed between the first main area 110 and the second main area 120. According to an embodiment, the third main area 130 may be an area covering a hinge structure of the electronic device 10 when a support structure is in a first mounting state (refer, e.g., to FIG. 4C).

According to an embodiment, the third main area 130 may be connected to the (1-2)th main area 115 through the second rotation axis 162. For example, the third main area 130 may rotate relative to the (1-2)th main area 115 with reference to the second rotation axis 162. In addition, the third main area 130 may be disposed to form a predetermined angle with the (1-2)th main area 115 with reference to the second rotation axis 162, or may be disposed to form an angle of 180 degrees with the (1-2)th main area 115. According to an embodiment, the second rotation axis 162 may be made of a flexible materi also that the third main area 130 and the (1-2)th main area 115 are rotatable relative to each other.

According to an embodiment, the third main area 130 may be connected to the (2-1)th main area 121 through the third rotation axis 163. For example, the third main area 130 may rotate relative to the (2-1)th main area 121 with reference to the third rotation axis 163. In addition, the third main area 130 may be disposed to form a predetermined angle with the (2-1)th main area 121 with reference to the third rotation axis 163, or may be disposed to form an angle of 180 degrees with the (2-1)th main area 121. According to an embodiment, the third rotation axis 163 may be made of a flexible material so that the third main area 130 and the (2-1)th main area 121 are rotatable relative to each other.

According to an embodiment, the first sub area 140 may be connected to be rotatable relative to the second main area 120. According to an embodiment, the first sub area 140 may be connected to the (2-2)th main area 125 through the fifth rotation axis 165. For example, the first sub area 140 may rotate relative to the (2-2)th main area 125 with reference to the fifth rotation axis 165. In addition, the first sub area 140 may be disposed to form a predetermined angle with the (2-2)th main area 125 with reference to the fifth rotation axis 165, or may be disposed to form an angle of 180 degrees with the (2-2)th main area 125.

According to an embodiment, the second sub area 150 may be connected to be rotatable relative to the first sub area 140. According to an embodiment, the second sub area 150 may be connected to the first sub area 140 through the sixth rotation axis 166. For example, the second sub area 150 may rotate relative to the first sub area 140 with reference to the sixth rotation axis 166. In addition, the second sub area 150 may be disposed to form a predetermined angle with the first sub area 140 with reference to the sixth rotation axis 166, or disposed to form an angle of 180 degrees with the first sub area 140.

According to an embodiment, the second sub area 150 may have the length greater than the length of the first sub area 140 in a first direction (e.g., a Y-axis direction of FIG. 1A to FIG. 1B).

According to an embodiment, the at least one connector 170 may be disposed on the second sub area 150. According to an embodiment, the at least one connector 170 may be disposed on a front surface (e.g., surface illustrated in FIG. 1A) of the second sub area 150, but it is not limited thereto.

According to an embodiment, the at least one connector 170 may be disposed adjacent to a corner of the second sub area 150. According to an embodiment, the at least one connector 170 may be referred to as a fixing structure of the support cover 100.

According to an embodiment, the second sub area 150 may further include a first protrusion portion 155 configured on at least a part of one surface of the second sub area 150 (e.g., a front surface of the second sub area 150 illustrated in FIG. 1A). The first protrusion portion 155 may have a shape protruding from at least a part of the second sub area 150. According to an embodiment, the first protrusion portion 155 may be a part for supporting at least a part of the electronic device 10 in various states of the support cover 100. The first protrusion portion 155 may be disposed adjacent to the sixth rotation axis 166. In addition, the first protrusion portion 155 may extend along the lengthwise direction of the second sub area 150 (e.g., X-axis direction of FIG. 1A).

According to an embodiment, the first sub area 140 may further include a second protrusion portion 129 configured on at least a part of one surface of the first sub area 140 (e.g., a rear surface of the first sub area 140 illustrated in FIG. 1B). The second protrusion portion 129 may have a shape protruding from at least a part of the first sub area 140. According to an embodiment, the second protrusion portion 129 may be a part for supporting at least a part of the electronic device 10 in various states of the support cover 100 or for supporting at least a part of the (1-1)th main area 111. The second protrusion portion 129 may be disposed adjacent to the fourth rotation axis 164. In addition, the second protrusion portion 129 may extend along the lengthwise direction of the first sub area 140 (e.g., X-axis direction of FIG. 1A).

Figure 2:
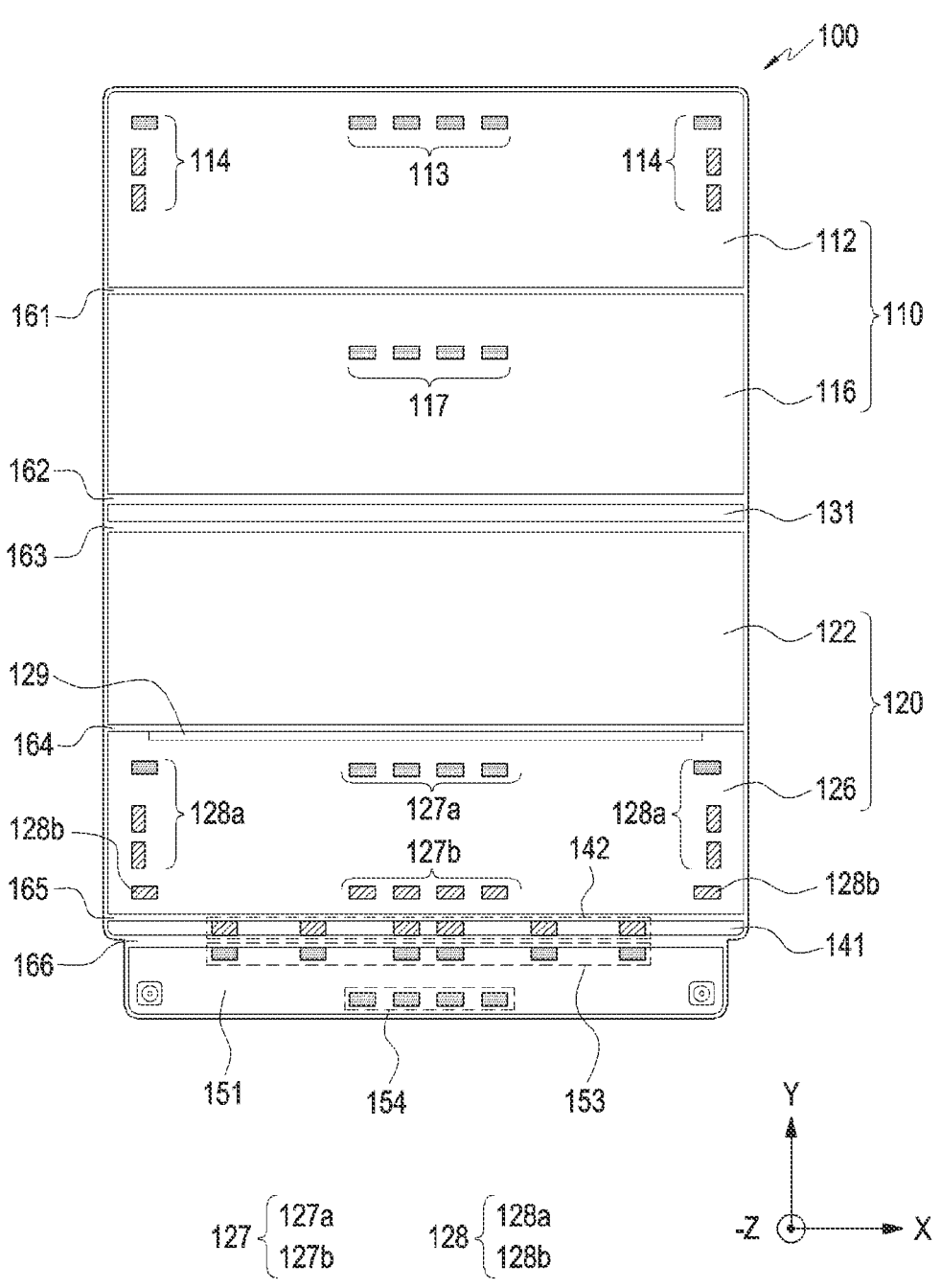
FIG. 2 is a diagram illustrating core members of a support cover according to various embodiments.

FIG. 2 is a diagram illustrating a view for explaining core members of a support cover 100 according to various embodiments.

An embodiment of FIG. 2 may be coupled to example embodiments illustrated in FIGS. 1A to 1B or embodiments illustrated by way of non-limiting example in FIGS. 3A to 13C.

FIG. 2 may be a diagram illustrating a support cover 100 viewed in substantially the same direction as FIG. 1B, but is not limited thereto.

According to an embodiment, the support cover 100 may include a plurality of core members.

According to an embodiment, the support cover 100 may be made of a fabric member in which a plurality of core members are disposed to be spaced apart from each other and which covers the plurality of core members.

According to an embodiment, each of multiple areas may have a structure in which fabric members are stacked on opposite surfaces of the core member. For example, the (1-1)th main area 111 may have a structure in which fabric members are stacked on opposite surfaces of the (1-1)th main core member 112.

According to an embodiment, each of a plurality of rotation axes may have a pair of fabric members in a stacked structure. For example, the first rotation axis 161 may have a structure in which a pair of fabric members are attached to each other.

According to an embodiment, a plurality of core members may be defined as and referred to a plurality of core materials. According to an embodiment, each of a plurality of core members may be a compressed lightweight epoxy member. For example, each of the plurality of core members may have a first thickness (e.g., about 1.3t or about 1.3 mm).

According to an embodiment, a fabric member may have a second thickness (e.g., about 0.5t or about 0.5 mm). The fabric member may be attached to opposite surfaces of the core member in a plurality of areas by an adhesive agent (e.g., adhesive), or a pair of fabric members may be attached in rotation axes by an adhesive agent (e.g., adhesive).

A plurality of core members may include at least one of a (1-1)th main core member 112, a (1-2)th main core member 116, a (2-1)th main core member 122, a (2-2)th main core member 126, a third main core member 131, a first sub core member 141, or a second sub core member 151.

According to an embodiment, the support cover 100 may include magnetic members described below. The magnetic members may be a permanent magnet, but it is not limited thereto. Each of the magnetic members may include a magnet or a magnetic material. In FIG. 2, the magnetic members having the same pattern (or the same design) may be disposed to have the same polarity toward a first direction of the support cover 100 (e.g., −Z axis direction of FIG. 2). For example, a part of the magnetic members (113, 117, 127*a*, 153, 154, a part of 114 and a part of 128*a*) may be illustrated in a dot pattern, S pole of the magnetic members may be disposed toward the first direction (e.g., −Z axis direction of FIG. 2), the rest of the magnetic members (127*b*, 128*b*, 142, the rest of 114 and the rest of 128*a*) may be illustrated in an oblique pattern, and N pole of the magnetic members may be disposed toward the first direction (e.g., −Z axis direction of FIG. 2). However, the arrangement of the magnet members of the support cover 100 is not limited thereto, but is variously disposed according to a design change.

According to an embodiment, the (1-1)th main area 111 may include a (1-1)th main core member 112. According to an embodiment, the (1-1)th main area 111 may include magnetic members 113, 114 disposed in the (1-1)th main core member 112. The magnetic members of the (1-1)th main area 111 may be a permanent magnet, but it is not limited thereto.

According to an embodiment, the magnetic members of the (1-1)th main area 111 may include the (1-1)th center magnetic members 113 and the (1-1)th corner magnetic members 114.

According to an embodiment, the (1-2)th main area 115 may include a (1-2)th main core member 116. According to an embodiment, the (1-2)th main area 115 may include magnetic members 117 disposed in the (1-2)th main core member 116. The magnetic members of the (1-2)th main area 115 may be a permanent magnet, but it is not limited thereto.

According to an embodiment, the magnetic members of the (1-2)th main area 115 may include a (1-2)th center magnetic members 117.

According to an embodiment, the third main area 130 may include a third main core member 131.

According to an embodiment, the (2-1)th main area 121 may include a (2-1)th main core member 122.

According to an embodiment, the (2-2)th main area 125 may include a (2-2)th main core member 126. According to an embodiment, the (2-2)th main area 125 may include magnetic members 127, 128 disposed in the (2-2)th main core member 126. The magnetic members of the (2-2)th main area 125 may be a permanent magnetic, but it is not limited thereto.

According to an embodiment, the (2-2)th main area 125 may include a (2-2)th center magnetic members 127 and a (2-2)th corner magnetic members 128. According to an embodiment, the (2-2)th center magnetic members 127 may include the (2-2)th upper center magnetic members 127a disposed adjacent to the fourth rotation axis 164 and the (2-2)th lower center magnetic members 127b disposed adjacent to the fifth rotation axis 165. According to an embodiment, the (2-2)th corner magnetic members 128 may include the (2-2)th upper corner magnetic members 128a configured to be coupled to the (1-1)th corner magnetic members 114 and the (2-2)th lower corner magnetic members 128b.

According to an embodiment, the first sub area 140 may include a first sub core member 141. According to an embodiment, the first sub area 140 may include the first sub magnetic members 142 disposed in the first sub core member 141. The first sub magnetic members 142 of the first sub area 140 may be a permanent magnetic, but it is not limited thereto.

According to an embodiment, the second sub area 150 may include a second sub core member 151. According to an embodiment, the second sub area 150 may include magnetic members 153, 154 disposed in the second sub core member 151. The magnetic members of the second sub area 150 may be a permanent magnet, but it is not limited thereto. According to an embodiment, the magnetic members of the second sub area 150 may include second upper sub magnetic members 153 configured to form a bonding force with the first sub magnetic members 142 and second lower sub magnetic members 154 configured to form a bonding force with the (1-1)th center magnetic members 113.

Figure 3A:
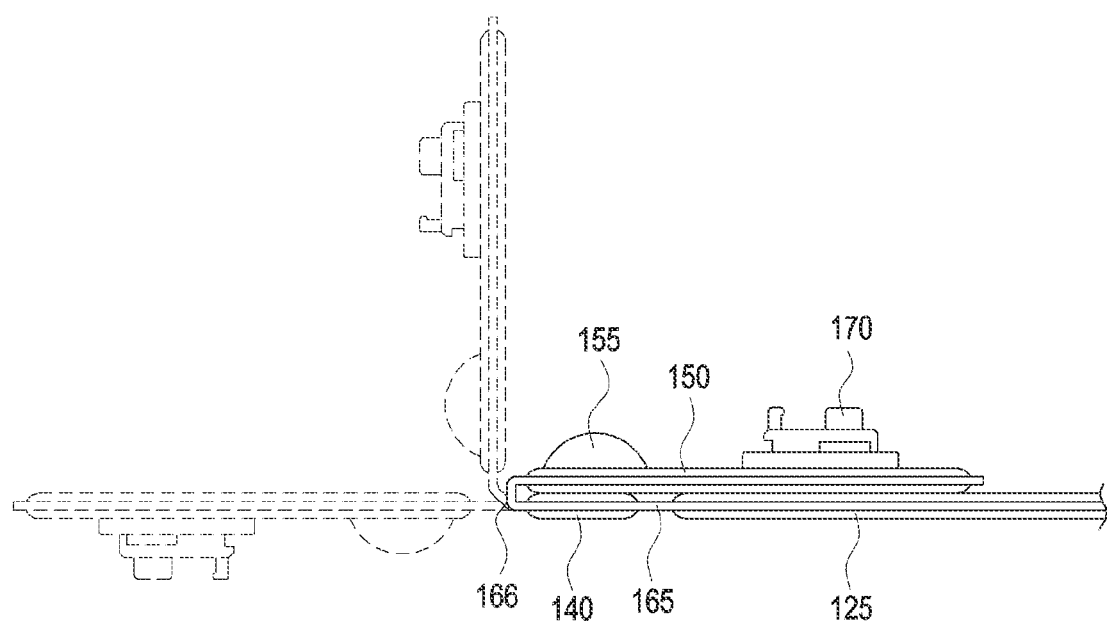
FIG. 3A is a diagram illustrating at least a part of a support cover according various embodiments.

FIG. 3A is a diagram illustrating a view of at least a part of a support cover 100 according various embodiments.

Figure 3B:
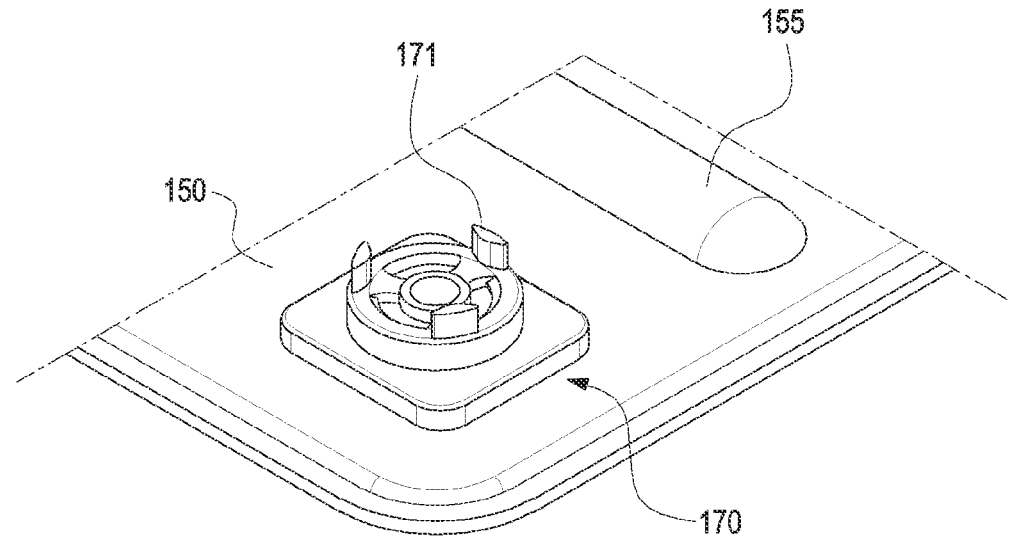
FIG. 3B is a perspective view illustrating at least one connector according various embodiments.

FIG. 3B is a perspective view illustrating at least one connector 170 according various embodiments.

Figure 3C:
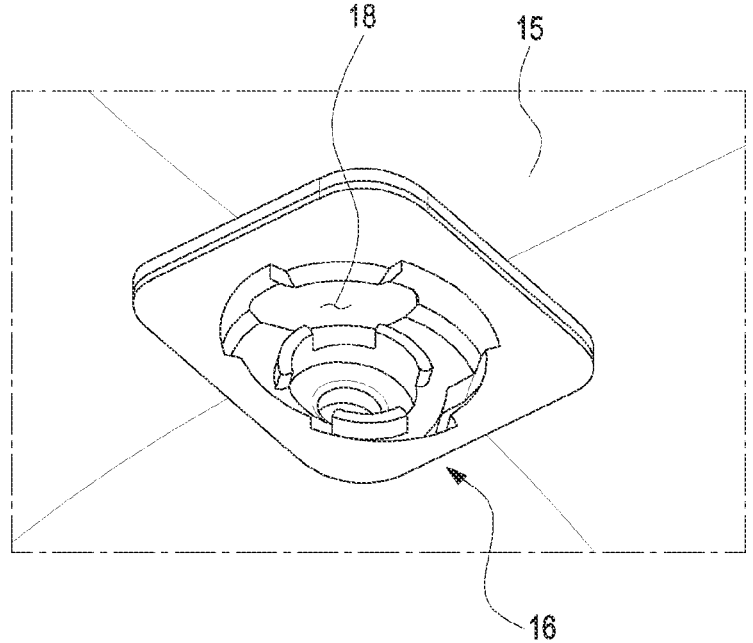
FIG. 3C is a perspective view illustrating a fixing structure of an electronic device according various embodiments.

FIG. 3C is a perspective view illustrating a fixing structure 16 of an electronic device 10 according various embodiments.

Embodiments of FIGS. 3A, 3B and 3C may be coupled to embodiments of FIGS. 1A to 2 or embodiments of FIGS. 4A to 13C, but is not limited thereto.

Referring to FIG. 3A, the second sub area 150 may rotate relative to the first sub area 140 with reference to the sixth rotation axis 166.

According to an embodiment, the second sub area 150 may be disposed to overlap the first sub area 140 and the (2-2)th main area 125.

According to an embodiment, when the second sub area 150 is disposed to overlap the first sub area 140 and the (2-2)th main area 125, the second upper sub magnet members 153 of the second sub area 150 may form a bonding force with the first sub magnetic members 142 of the first sub area 140, and the second lower sub magnetic members 154 of the second sub area 150 may form a bonding force with the (2-2)th lower center magnetic members 127b of the (2-2)th main area 125. Therefore, a state in which the second sub area 150 is fixed to the first sub area 140 and the (2-2)th main area 125 may be maintained.

Referring to FIG. 3B and FIG. 3C, at least one connector 170 of the support cover 100 may include a plurality of protrusions 171. The second housing 15 of the electronic device 10 may include at least one fixing structure 16. The at least one fixing structure 16 may be configured to have a shape corresponding to the at least one connector 170 of the support cover 100. The at least one fixing structure 16 may be a part concavely configured from at least a part of the second housing 15. According to an embodiment, the at least one fixing structure 16 may include a plurality of fixing grooves 18 configured to enable the plurality of protrusions 171 of the at least one connector 170 to be inserted and hooked. The plurality of protrusions 171 are hooked and coupled to the plurality of fixing grooves 18, so that a coupling state of the at least one connector 170 and the at least one fixing structure 16 may not be easily released.

According to an embodiment, the at least one connector 170 may be coupled to the at least one fixing structure 16 or may be separated from the at least one fixing structure 16.

FIG. 4A is a perspective view illustrating a state in which an electronic device 10 and a support cover 100 are separated according to various embodiments.

FIG. 4B is a perspective view illustrating a state in which an electronic device 10 and a support cover 100 are coupled according to various embodiments.

FIG. 4C is a perspective view illustrating a first state of a support cover 100 supporting an electronic device 10 according to various embodiments.

Embodiments of FIGS. 4A, 4B and 4C may be coupled to embodiments FIGS. 1A to 3C or embodiments of FIGS. 5A to 13C, but is not limited thereto.

Referring to FIG. 4A, a state in which the second sub area 150 is disposed to overlap the first sub area 140 and the (2-2)th main area 125 is illustrated.

In the state of FIG. 4A, the electronic device 10 is seated on the (2-1)th main area 121 and the (2-2)th main area 125 to be disposed as illustrated in FIG. 4B. At least one fixing structure 16 of the electronic device 10 may enable the electronic device 10 to be fixed to the support cover 100 by being coupled to at least one connector 170 of the support cover 100.

In the state as illustrated in FIG. 4B, the (1-1)th main area 111 and the (1-2)th main area 115 may be rotated to cover the electronic device 10 to be disposed as illustrated in FIG. 4C.

FIG. 4C illustrates a state in which the support cover 100 of the electronic device 10 is disposed in a first state. The first state of the support cover 100 may be defined as a pouch mode of the support cover 100. In the first state of the support cover 100, the support cover 100 may cover the external appearance of the electronic device 10 to enable the electronic device 10 to be protected from an outside impact. In addition, in the first state of the support cover 100, the support cover 100 may cover the external appearance of the electronic device 10 to prevent and/or reduce a scratch from being formed on the surface of the electronic device 10.

Figure 5A:
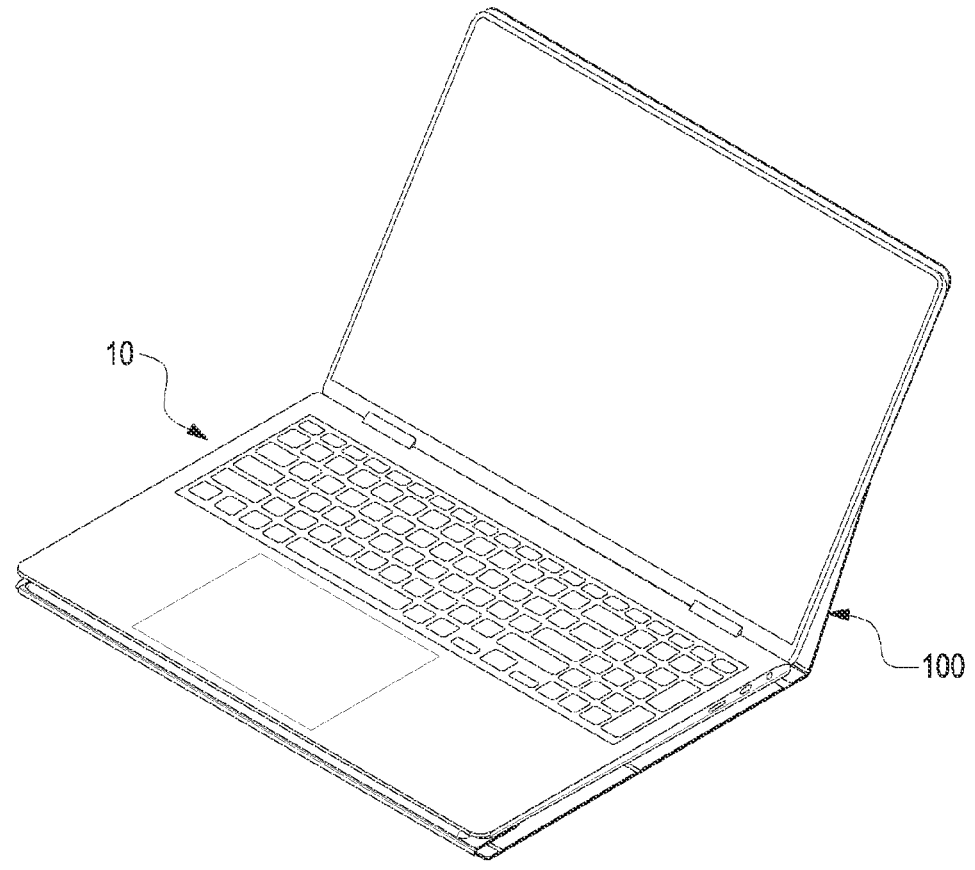
FIG. 5A is a perspective view illustrating a state in which an electronic device and a support cover are coupled according to various embodiments.

FIG. 5A is a perspective view illustrating a state in which an electronic device 10 and a support cover 100 are coupled according to various embodiments.

Figure 5B:
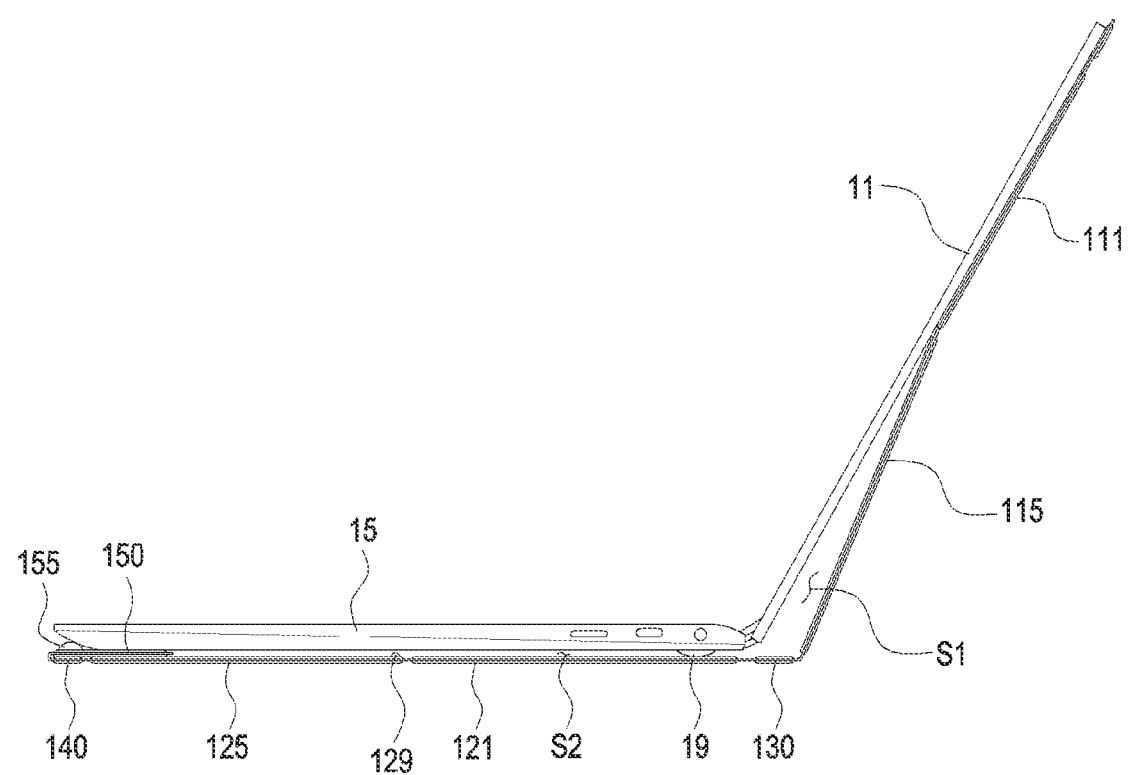
FIG. 5B is a diagram illustrating a side view of a second state of a support cover supporting an electronic device according to various embodiments.

FIG. 5B is a diagram illustrating a side view of a second state of a support cover 100 supporting an electronic device 10 according to various embodiments.

Embodiments of FIGS. 5A and 5B may be coupled to embodiments of FIGS. 1A to 4C or embodiments of FIGS. 6A to 12C, but is not limited thereto.

According to an embodiment, the first housing 11 of the electronic device 10 may be disposed to form an obtuse angle with respect to the second housing.

According to an embodiment, a state of the electronic device 10 illustrated in FIG. 5A and FIG. 5B may be a state for using the electronic device 10 in a typing mode for a keyboard work by a user.

FIG. 5B illustrates a state in which the support cover 100 of an electronic device 10 is disposed in a second state. The second state of the support cover 100 may be defined as a normal laptop mode of the support cover 100.

According to an embodiment, the support cover 100 may cover the rear surface of the first housing 11 of the electronic device 10 by the (1-1)th main area 111 and the (1-2)th main area 115. According to an embodiment, the support cover 100 may cover the rear surface of the second housing 15 of the electronic device 10 by the (2-1)th main area 121 and the (2-2)th main area 125.

According to an embodiment, the (1-1)th main area 111 may be in close contact with the rear surface of the first housing 11.

According to an embodiment, the (1-1)th center magnetic members 113 and the (1-2)th corner magnet members 114 of the (1-1)th main area 111 may form a bonding force with a metal part of the first housing 11.

According to an embodiment, the (1-2)th main area 115 may be disposed to be inclined with respect to the rear surface of the first housing 11. For example, the (1-2)th main area 115 may be disposed to form an obtuse angle with respect to the (1-1)th main area 111.

According to an embodiment, the (1-2)th main area 115 is disposed to be inclined with respect to the rear surface of the first housing 11, so that the (1-2)th main area 115 may be disposed to be generally spaced apart from the rear surface of the first housing 11. Therefore, a space S1, through which air flows, may be configured between the (1-2)th main area 115 and the rear surface of the first housing 11. According to an embodiment, the space S1 is configured between the (1-2)th main area 115 and the rear surface of the first housing 11, so that air inside the first housing 11 may be smoothly discharged through the space S1.

According to an embodiment, the third main area 130 may be disposed to form an obtuse angle with respect to the (1-2)th main area 115, and disposed to have an angle of 180 degrees with respect to the (2-1)th main area 121.

According to an embodiment, the (2-1)th main area 121 and the (2-2)th main area 125 may be disposed to have an angle of 180 degrees with respect to the third main area 130.

According to an embodiment, the second sub area 150 may be disposed to overlap the first sub area 140 and the (2-2)th main area 125. In addition, the at least one connector 170 of the second sub area 150 may be coupled to the at least one fixing structure 16 of the second housing 15.

According to an embodiment, the second sub area 150 and the (2-2)th main area 125 may be disposed to overlap each other, so that a stepped portion may be configured.

According to an embodiment, the rear surface of the second housing 15 may be disposed to be generally spaced apart from the (2-1)th main area 121 and the (2-2)th main area 125. According to an embodiment, the rear surface of the second housing 15 may be generally spaced apart from the (2-1)th main area 121 and the (2-2)th main area 125 by the stepped portion, the second protrusion portion 129, and the third protrusion portion 19 of the second housing 15. The third protrusion portion 19 of the second housing 15 may be made of an elastic member of a rubber material coupled to the rear surface of the second housing 15.

Accordingly, a space S2, through which air flows, may be configured between the rear surface of the second housing 15 and the (2-1)th main area 121 and the (2-2)th main area 125. According to an embodiment, the space S2 is configured between the rear surface of the second housing 15 and the (2-1)th main area 121 and the (2-2)th main area 125, so that air inside the second housing may be smoothly discharged through the space S2.

Figure 6A:
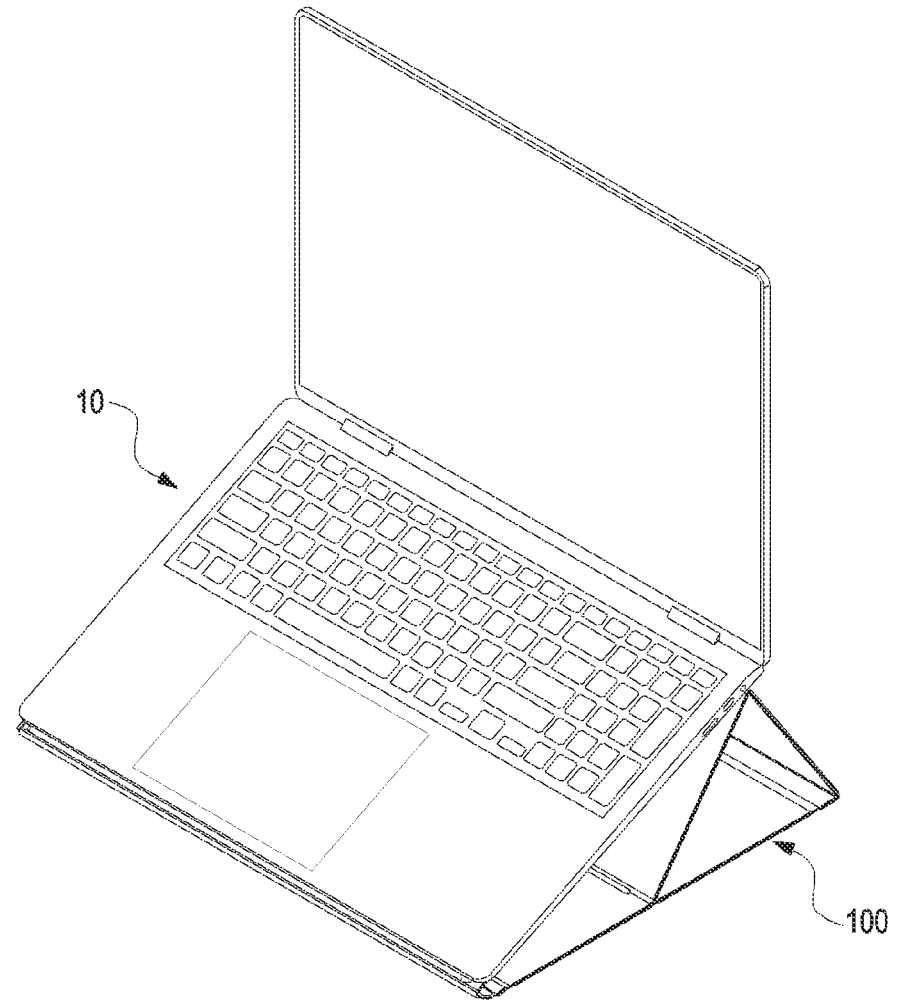
FIG. 6A is a perspective view illustrating a state in which an electronic device and a support cover are coupled according to various embodiments.

FIG. 6A is a perspective view illustrating a state in which an electronic device 10 and a support cover 100 are coupled according to various embodiments.

Figure 6B:
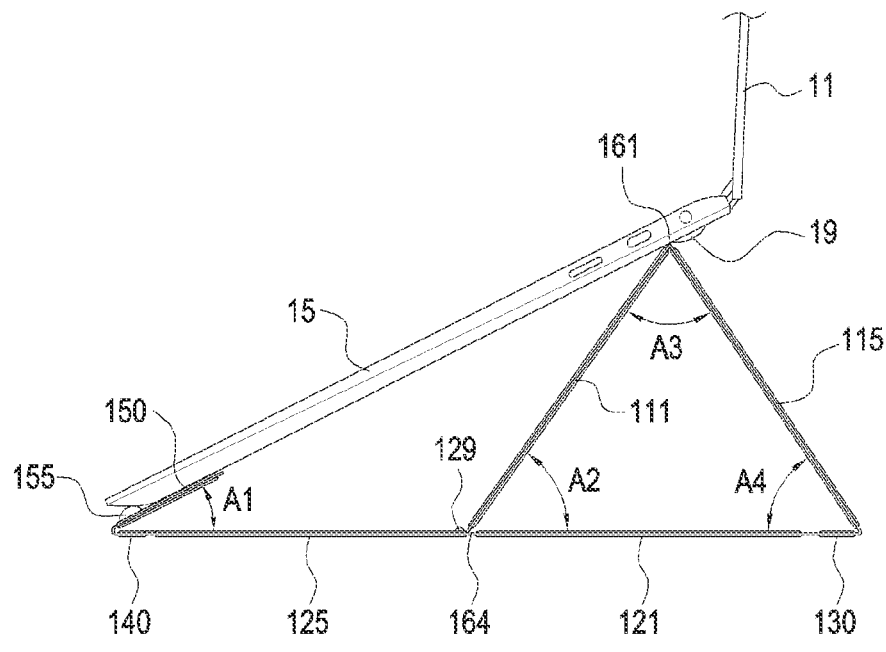
FIG. 6B is a diagram illustrating a side view of a third state of a support cover supporting an electronic device according to various embodiments.

FIG. 6B is a diagram illustrating a side view of a third state of a support cover 100 supporting an electronic device 10 according to various embodiments.

Embodiments of FIGS. 6A and 6B may be coupled to embodiments of FIGS. 1A to 5B or embodiments of FIGS. 7A to 13C, but is not limited thereto.

According to an embodiment, the first housing 11 of an electronic device 10 may be disposed to form an obtuse angle with respect to the second housing 15.

FIG. 6A illustrates a state in which the support cover 100 of the electronic device 10 is disposed in a third state. The third state of the support cover 100 may be defined as a low angle laptop mode of the support cover 100.

According to an embodiment, in the support cover 100, the first rotation axis 161 may support at least a part of the rear surface of the second housing 15. According to an embodiment, one end of the (1-1)th main area 111 may be fixed by the second protrusion portion 129 or the fourth rotation axis 164. In addition, the (1-1)th main area 111 may be disposed to form a second angle A2 which is an acute angle with respect to the (2-1)th main area 121. According to an embodiment, the (1-2)th main area 115 may be disposed to form a third angle A3 which is an acute angle with respect to the (1-1)th main area 111. In addition, the (1-2)th main area 115 may be disposed to form a fourth angle A4 which is an acute angle with respect to the third main area 130 or the (2-1)th main area 121.

According to an embodiment, the (2-1)th main area 121 and the third main area 130 may be disposed to have an angle of 180 degrees.

According to an embodiment, the (1-1)th main area 111, the (1-2)th main area 115, the third main area 130, and the (2-1)th main area 121 may configure a cross-sectional structure generally having a triangle shape, and the first rotation axis 161 may support the rear surface of the second housing 15.

According to an embodiment, the (2-2)th main area 125 may be disposed to have an angle of 180 degrees with respect to the (2-1)th main area 121. In addition, the first sub area 140 may be disposed to have an angle of 180 degrees with respect to the (2-2)th main area 125.

According to an embodiment, the second sub area 150 may be disposed to form a first angle which is an acute angle with respect to the first sub area 140. In addition, the at least one connector 170 of the second sub area 150 may be coupled to the at least one fixing structure 16 of the second housing 15.

According to an embodiment, the second housing 15 may be supported by the support cover 100 in the third state to be disposed to have a first angle A1 with respect to the ground (or table).

According to an embodiment, the first protrusion portion 155 of the second sub area 150 may support at least one of the second housing 15, so as to limit a sliding movement of the second housing 15.

According to an embodiment, the second angle A2 and the fourth angle A4 may be substantially equal to each other. According to an embodiment, the third angle A3 may be substantially equal to the second angle A2 and the fourth angle A4 or may be smaller than the second angle A2 and the fourth angle A4.

According to an embodiment, the first angle A1 may be an angle smaller than that of the third angle A3.

Figure 7A:
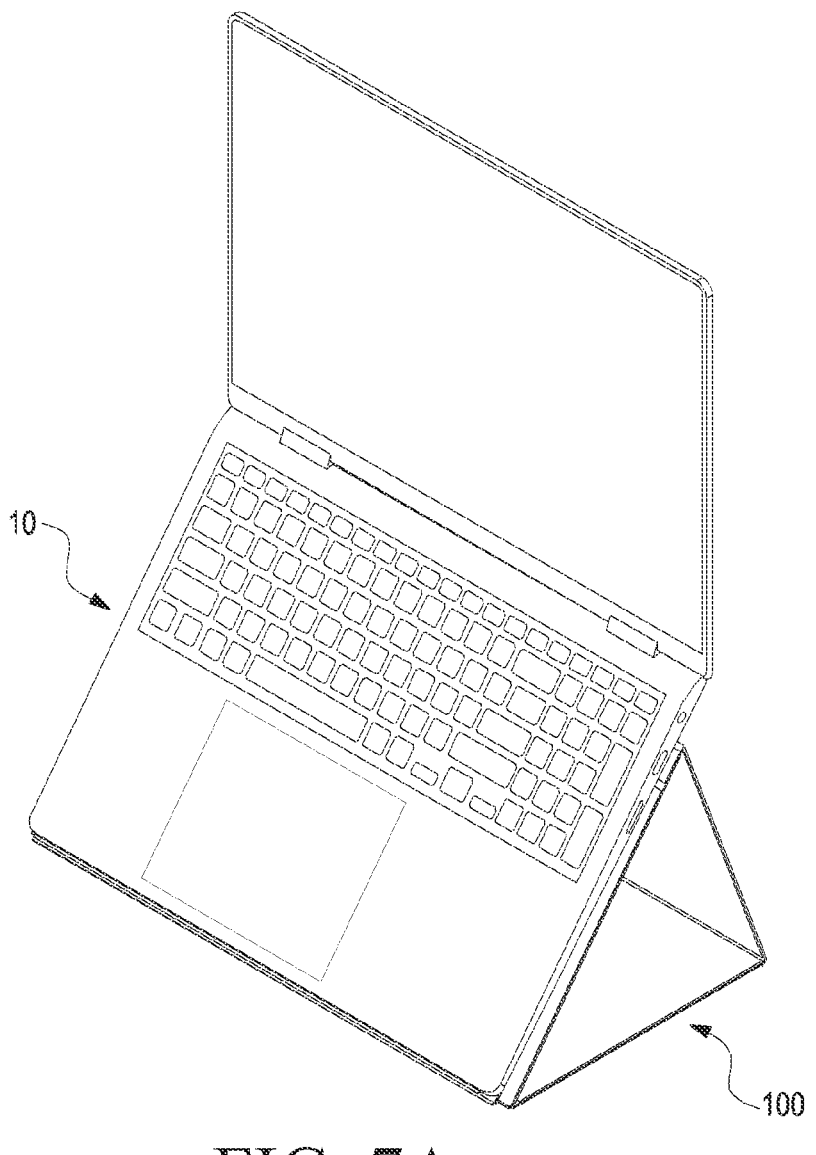
FIG. 7A is a perspective view illustrating a state in which an electronic device and a support cover are coupled according to various embodiments.

FIG. 7A is a perspective view illustrating a state in which an electronic device 10 and a support cover 100 are coupled according to various embodiments.

Figure 7B:
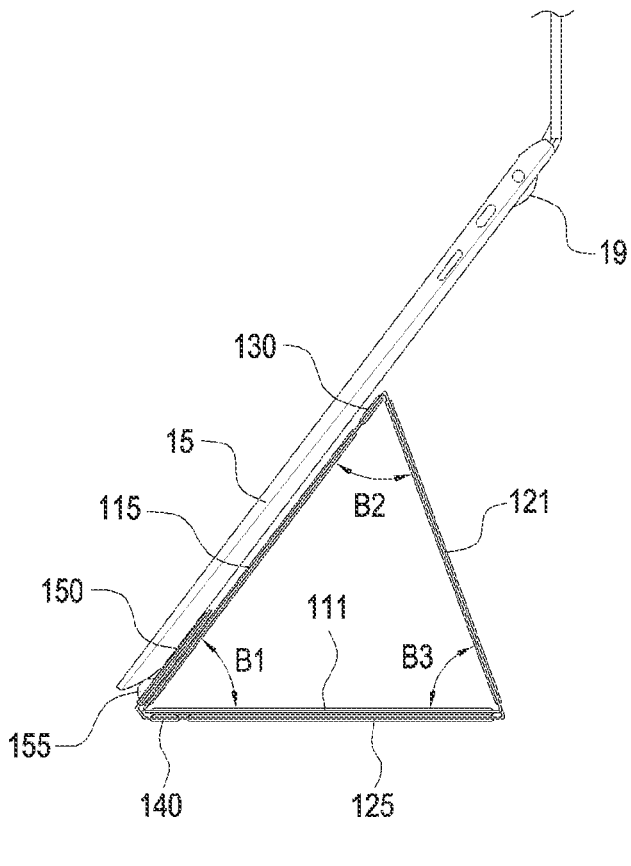
FIG. 7B is a diagram illustrating a side view of a fourth state of a support cover supporting an electronic device according to various embodiments.

FIG. 7B is a diagram illustrating a side view of a fourth state of a support cover 100 supporting an electronic device 10 according to various embodiments.

Embodiments of FIGS. 7A and 7B may be coupled to embodiments of FIGS. 1A to 6B or embodiments of FIGS. 8A to 13C, but is not limited thereto.

According to an embodiment, the first housing 11 of the electronic device 10 may be disposed to form an obtuse angle with respect to the second housing 15. An angle of the first housing 11 and the second housing 15 of the electronic device 10 as illustrated in FIG. 7A to FIG. 7B may be an angle larger than an angle of the first housing 11 and the second housing 15 of the electronic device 10 as illustrated in FIG. 6A to FIG. 6B.

FIG. 7B illustrates a state in which the support cover 100 of the electronic device 10 is disposed in a third state. The fourth state of the support cover 100 may be defined as a high angle laptop mode of the support cover 100.

According to an embodiment, the (1-1)th main area 111 may be disposed to overlap the (2-2)th main area 125 and the first sub area 140. According to an embodiment, the (1-1)th center magnetic members 113 of the (1-1)th main area 111 may form a bonding force with the (2-2)th upper center magnetic members 127a of the (2-2)th main area 125. In addition, the (1-1)th corner magnetic members 114 of the (1-1)th main area 111 may form a bonding force with the (2-2)th upper corner magnetic members 128a of the (2-2)th main area 125.

According to an embodiment, the (1-2)th main area 115 may be disposed to form a first angle B1 which is an acute angle with respect to the (1-1)th main area 111. According to an embodiment, the (1-2)th main area 115 may be in contact with the second sub area 150. According to an embodiment, the (1-2)th magnetic members 127 of the (1-2)th main area 115 may form a bonding force with the second lower sub magnetic member 154 of the second sub area 150.

According to an embodiment, the third main area 130 may be disposed to substantially form an angle of 180 degrees with respect to the (1-2)th main area 115, but it is not limited thereto. According to an embodiment, the third main area 130, the (1-2)th main area 115, and the second sub area 150 may support the rear surface of the second housing 15.

According to an embodiment, the (2-1)th main area 121 may be disposed to form a second angle B2 which is an acute angle with respect to the third main area 130 and the (1-2)th main area 115.

According to an embodiment, the (2-1)th main area 121 may be disposed to form a third angle B3 which is an acute angle with respect to the (1-1)th main area 111 or the (2-2)th main area 125.

According to an embodiment, at least a part of the second housing 15 of the electronic device 10 is supported by the first protrusion portion 155 of the second sub area 150, so that a sliding movement of the second housing 15 downwards may be limited.

Figure 8A:
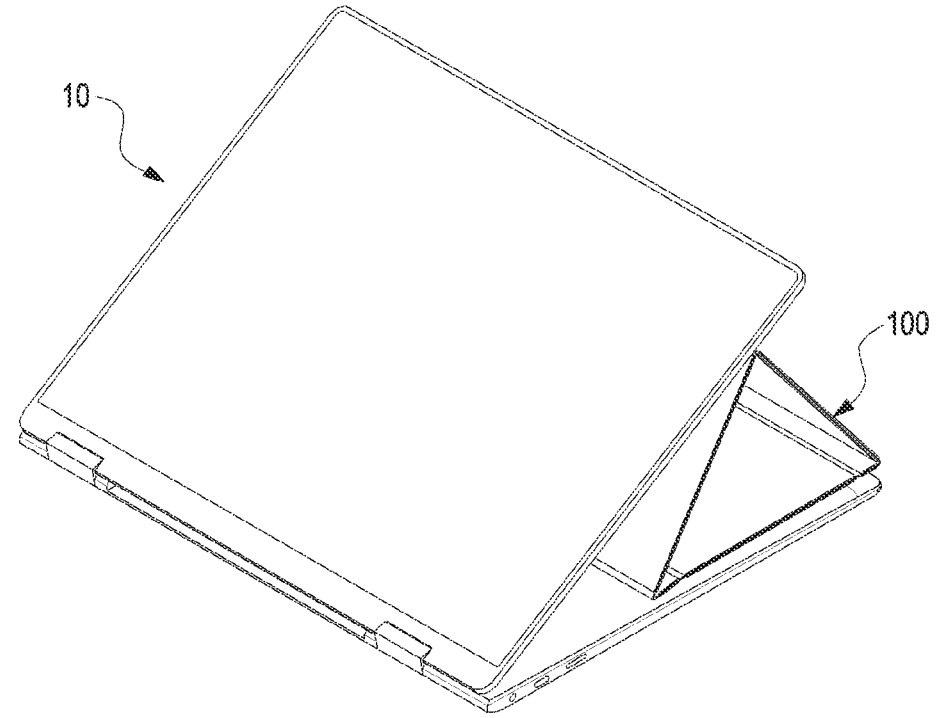
FIG. 8A is a perspective view illustrating a state in which an electronic device and a support cover are coupled according to various embodiments.

FIG. 8A is a perspective view illustrating a state in which an electronic device 10 and a support cover 100 are coupled according to various embodiments.

Figure 8B:
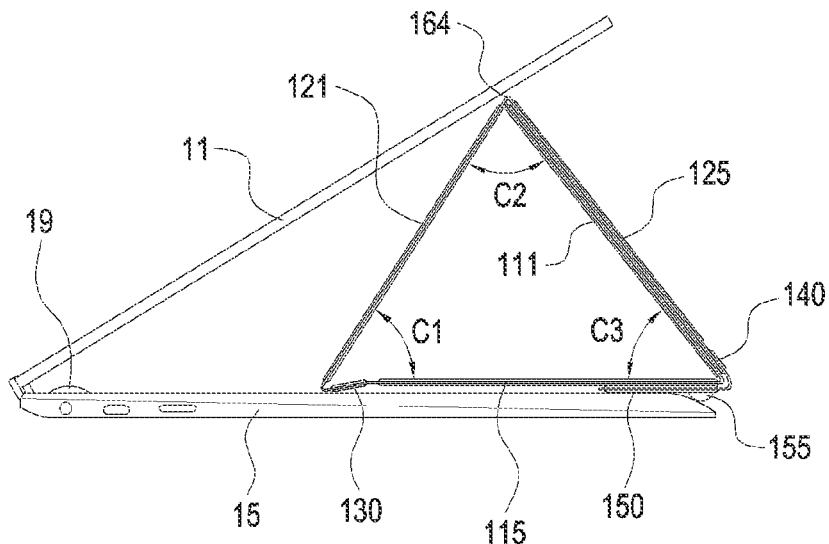
FIG. 8B is a diagram illustrating a side view of a fifth state of a support cover supporting an electronic device according to various embodiments.

FIG. 8B is a diagram illustrating a side view of a fifth state of a support cover 100 supporting an electronic device 10 according to various embodiments.

Embodiments of FIGS. 8A and 8B may be coupled to embodiments of FIGS. 1A to 7B or embodiments of FIGS. 9A to 13C, but is not limited thereto.

According to an embodiment, the first housing 11 of the electronic device 10 may be disposed to form an acute angle with respect to the second housing 15. For example, the rear surface of the first housing 11 and the rear surface of the second housing 15 may be disposed to form an acute angle.

FIG. 8B illustrates a state in which the support cover 100 of the electronic device 10 is disposed in a fifth state. The fifth state of the support cover 100 may be defined as a high angle tablet mode of the support cover 100.

According to an embodiment, the fourth rotation axis 164 of the support cover 100 may support at least a part of the rear surface of the first housing 11.

According to an embodiment, the (1-1)th main area 111 may be disposed to overlap the (2-2)th main area 125 and the first sub area 140. According to an embodiment, the (1-1)th center magnetic members 113 of the (1-1)th main area 111 may form a bonding force with the (2-2)th upper magnetic members 127a of the (2-2)th main area 125. In addition, the (1-1)th corner magnetic members 114 of the (1-1)th main area 111 may form a bonding force with the (2-2)th upper corner magnetic members 128a of the (2-2)th main area 125.

According to an embodiment, the (1-2)th main area 115 may be disposed to form a third angle C3 which is an acute angle with respect to the (1-1)th main area 111. According to an embodiment, the (1-2)th main area 115 may be in contact with the second sub area 150. According to an embodiment, the (1-2)th magnetic members 117 of the (1-2)th main area 115 may form a bonding force with the second lower sub magnetic members 154 of the second sub area 150.

According to an embodiment, the third main area 130 may be disposed to form an angle substantially larger than 180 degrees with respect to the (1-2)th main area 115, but it is not limited thereto. According to an embodiment, the third main area 130, the (1-2)th main area 115, and the second sub area 150 may be supported by the rear surface of the second housing 15.

According to an embodiment, the (2-1)th main area 121 may be disposed to form a first angle C1 which is an acute angle with respect to the third main area 130 or the (1-2)th main area 115.

According to an embodiment, the (2-1)th main area 121 may be disposed to form a second angle C2 which is an acute angle with respect to the (1-1)th main area 111 or the (2-2)th main area 125.

Figure 9A:
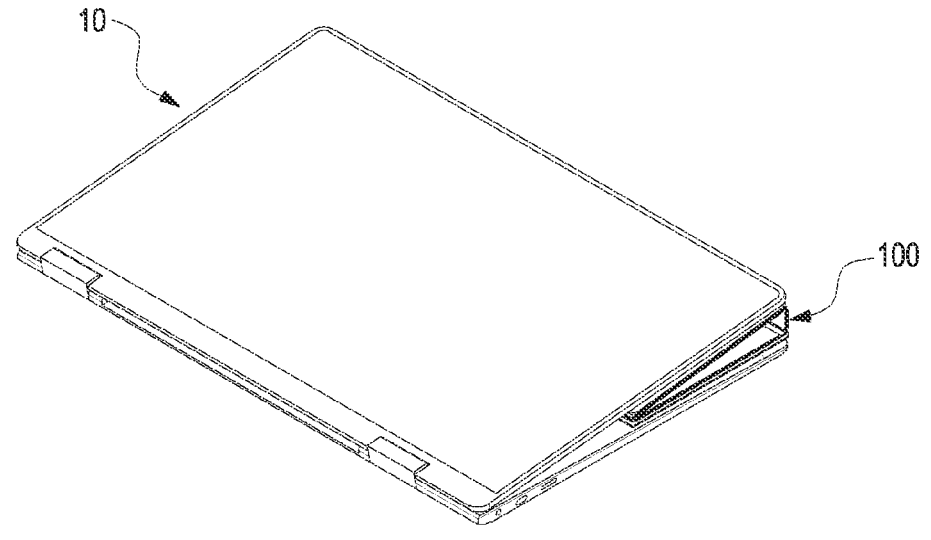
FIG. 9A is a perspective view illustrating a state in which an electronic device and a support cover are coupled according to various embodiments.

FIG. 9A is a perspective view illustrating a state in which an electronic device 10 and a support cover 100 are coupled according to various embodiments.

Figure 9B:
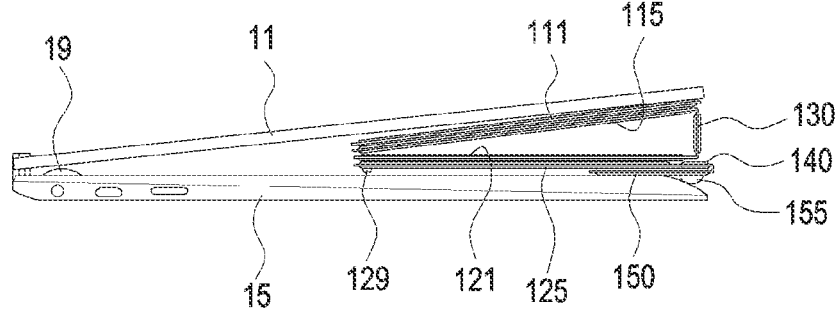
FIG. 9B is a diagram illustrating a side view of a sixth state of a support cover supporting an electronic device according to various embodiments.

FIG. 9B is a diagram illustrating a side view of a sixth state of a support cover 100 supporting an electronic device 10 according to various embodiments.

Embodiments of FIGS. 9A and 9B may be coupled to embodiments of FIGS. 1A to 8B or embodiments of FIGS. 10A to 13C, but is not limited thereto.

According to an embodiment, the first housing 11 of the electronic device 10 may be disposed to form an acute angle with respect to the second housing 15. For example, the rear surface of the first housing 11 and the rear surface of the second housing 15 may be disposed to form an acute angle. An angle of the first housing 11 and the second housing 15 illustrated in FIG. 9A to FIG. 9B may be smaller than an angle of the first housing 11 and the second housing 15 illustrated in FIG. 8A to FIG. 8B.

FIG. 9B illustrates a state in which the support cover 100 of the electronic device 10 is disposed in a sixth state. The sixth state of the support cover 100 may be defined as a low angle table mode of the support cover 100.

According to an embodiment, the (1-2)th main area 115 may be disposed to overlap the (1-1)th main area 111. For example, the (1-2)th main area 115 may support the rear surface of the first housing 11 together with the (1-1)th main area 111.

According to an embodiment, the third main area 130 may be disposed to form an acute angle with respect to the (1-2)th main area 115. In addition, the third main area 130 may be disposed to form an acute angle or a right angle with respect to the (2-1)th main area 121.

According to an embodiment, the (2-1)th main area 121 may be supported by the (2-2)th main area 125. In addition, the (2-1)th main area 121 may support the (1-1)th main area 111 and the (1-2)th main area 115.

According to an embodiment, the (2-2)th main area 125 may be disposed to overlap the (2-1)th main area 121. According to an embodiment, the (2-2)th main area 125, the first sub area 140, and the second sub area 150 may be supported by the rear surface of the second housing 15.

Figure 10A:
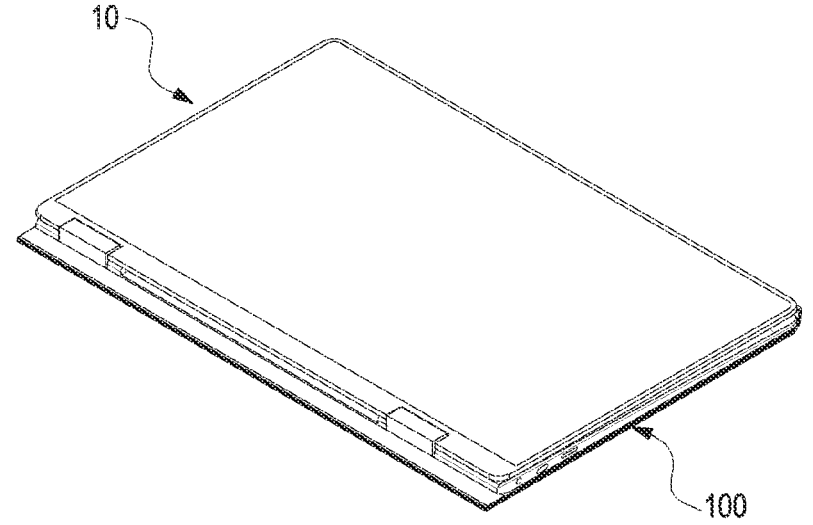
FIG. 10A is a perspective view illustrating a state in which an electronic device and a support cover are coupled according to various embodiments.

FIG. 10A is a perspective view illustrating a state in which an electronic device 10 and a support cover 100 are coupled according to various embodiments.

Figure 10B:
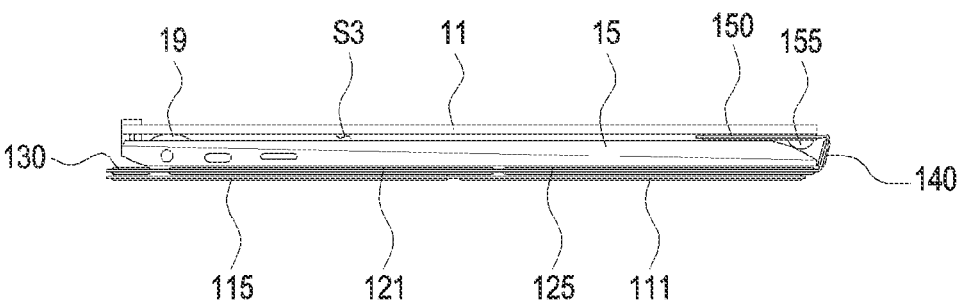
FIG. 10B is a diagram illustrating a side view of a seventh state of a support cover supporting an electronic device according to various embodiments.

FIG. 10B is a diagram illustrating a side view of a seventh state of a support cover 100 supporting an electronic device 10 according to various embodiments.

Embodiments of FIGS. 10A and 10B may be coupled to embodiments of FIGS. 1A to 9B or embodiments of FIGS. 11A to 13C, but is not limited thereto.

According to an embodiment, the first housing 11 of the electronic device 10 may be disposed to overlap the second housing 15. For example, the rear surface of the first housing 11 and the rear surface of the second housing 15 may be disposed to face each other.

FIG. 10B illustrates a state in which the support cover 100 of the electronic device 10 is disposed in a seventh state. The sixth state of the support cover 100 may be defined as the normal tablet mode of the support cover 100.

According to an embodiment, the second sub area 150 may be disposed between the rear surface of the first housing 11 and the rear surface of the second housing 15.

According to an embodiment, the front surface of the second housing 15 may be supported by the (1-1)th main area 111, the (1-2)th main area 115, the third main area 130, the (2-1)th main area 121, or the (2-2)th main area 125.

According to an embodiment, the (1-1)th main area 111 may be disposed to overlap the (2-2)th main area 125 and the (2-1)th main area 121. According to an embodiment, the (1-1)th center magnetic members 113 of the (1-1)th main area 111 may form a bonding force with the (2-2)th lower center magnetic members 127b of the (2-2)th main area 125. In addition, the (1-1)th corner magnetic members 114 of the (1-1)th main area 111 may form a bonding force with the (2-2)th lower corner magnetic members 128b and at least a part of the (2-2)th upper corner magnetic members 128a of the (2-2)th main area 125.

According to an embodiment, the (1-2)th main area 115 may be disposed to overlap the (2-1)th main area 121 and the third main area 130. According to an embodiment, the (1-2)th main area 115 may be disposed to have an angle of 180 degrees with respect to the (1-1)th main area 111.

According to an embodiment, the (2-1)th main area 121 may be disposed to have an angle of 180 degrees with respect to the third main area 130, and the (2-2)th main area 125 may be disposed to have an angle of 180 degrees with respect to the (2-1)th main area 121.

According to an embodiment, the first sub area 140 may be disposed to be inclined with respect to the (2-2)th main area 125. In addition, the second sub area 150 may be disposed to form an acute angle with respect to the first sub area 140.

According to an embodiment, the second sub area 150 is disposed between the rear surface of the first housing 11 and the rear surface of the second housing 15, so that a space S3, through which air flows, may be configured between the rear surface of the first housing 11 and the rear surface of the second housing 15. Therefore, air inside the housings may be smoothly discharged from the rear surface of the first housing 11 and the rear surface of the second housing 15.

Figure 11A:
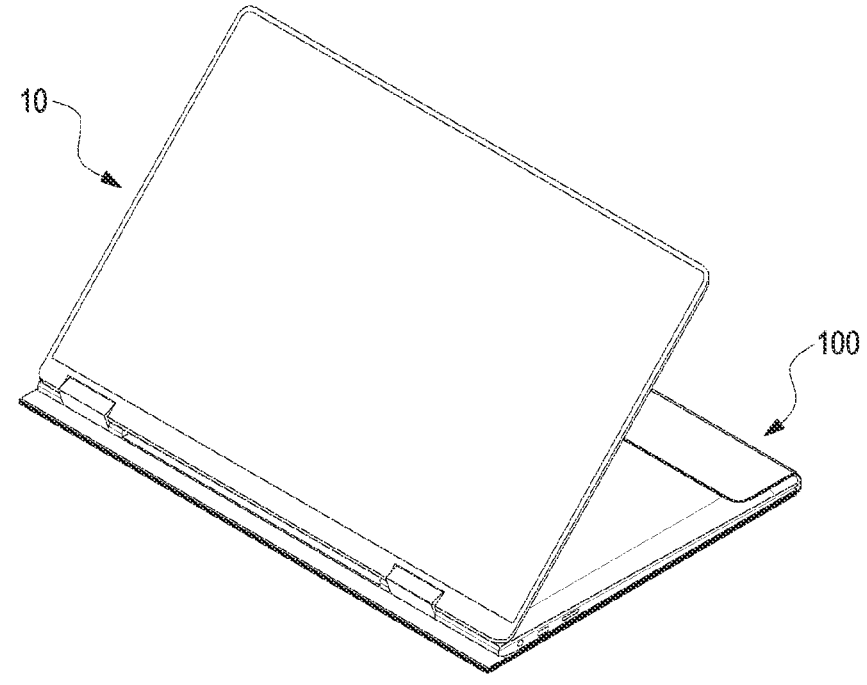
FIG. 11A is a perspective view illustrating a state in which an electronic device and a support cover are coupled according to various embodiments.

FIG. 11A is a perspective view illustrating a state in which an electronic device 10 and a support cover 100 are coupled according to various embodiments.

Figure 11B:
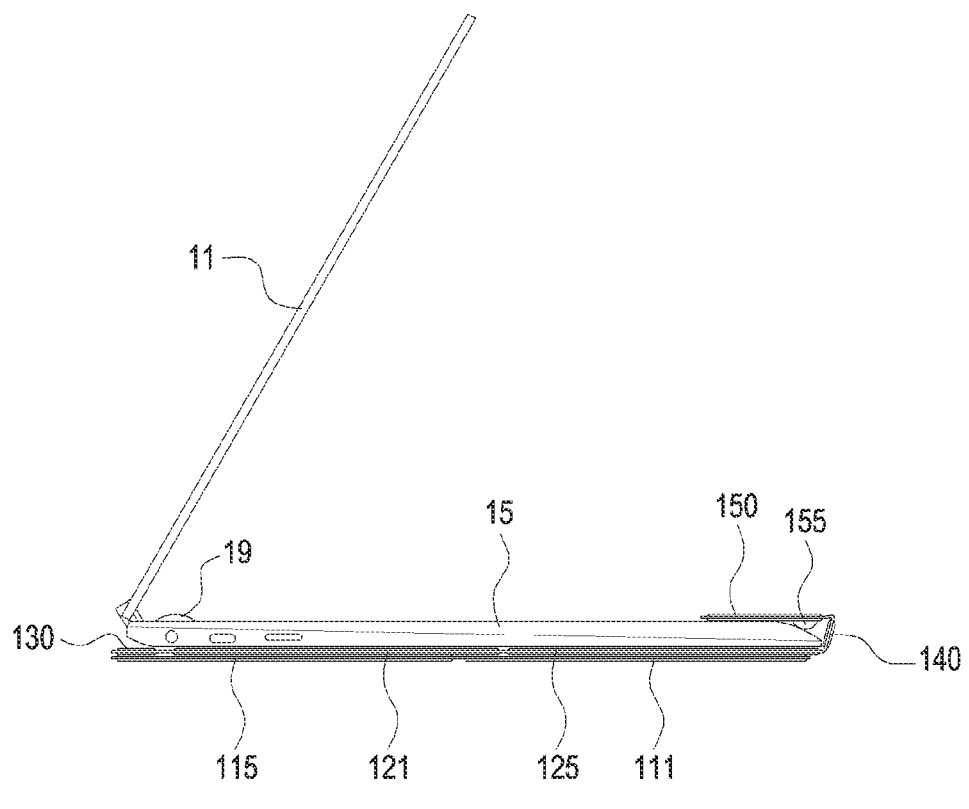
FIG. 11B is a diagram illustrating a side view of an eighth state of a support cover supporting an electronic device according to various embodiments.

FIG. 11B is a diagram illustrating a side view of an eighth state of a support cover 100 supporting an electronic device 10 according to various embodiments.

Embodiments of FIGS. 11A and 11B may be coupled to embodiments of FIGS. 1A to 10B or embodiments of FIGS. 12A to 13C, but is not limited thereto.

According to an embodiment, the first housing 11 of the electronic device 10 may be disposed to form an acute angle with respect to the second housing 15. For example, the rear surface of the first housing 11 and the rear surface of the second housing 15 may be disposed to form an acute angle.

FIG. 11B illustrates a state in which the support cover 100 of the electronic device 10 is disposed in an eighth state. The eighth state of the support cover 100 may be defined as a viewing mode of the support cover 100.

According to an embodiment, the second sub area 150 may be disposed on the rear surface of the second housing 15.

According to an embodiment, the front surface of the second housing 15 may be supported by the (1-1)th main area 111, the (1-2)th main area 115, the third main area 130, the (2-1)th main area 121, or the (2-2)th main area 125.

According to an embodiment, the (1-1)th main area 111 may be disposed to overlap the (2-2)th main area 125 and the (2-1)th main area 121. According to an embodiment, the (1-1)th center magnetic members 113 of the (1-1)th main area 111 may form a bonding force with the (2-2)th lower center magnetic members 127a of the (2-2)th main area 125. In addition, the (1-1)th corner magnetic members 114 of the (1-1)th main area 111 may form a bonding force with the (2-2)th lower corner magnetic members 128b and at least a part of the (2-2)th upper corner magnetic members 128a of the (2-2)th main area 125.

According to an embodiment, the (1-2)th main area 115 may be disposed to overlap the (2-1)th main area 121 and the third main area 130. According to an embodiment, the (1-2)th main area 115 may be disposed to have an angle of 180 degrees with respect to the (1-1)th main area 111.

According to an embodiment, the (2-1)th main area 121 may be disposed to have an angle of 180 degrees with respect to the third main area 130, and the (2-2)th main area 125 may be disposed to have an angle of 180 degrees with respect to the (2-1)th main area 121.

According to an embodiment, the first sub area 140 may be disposed to be inclined with respect to the (2-2)th main area 125. In addition, the second sub area 150 may be disposed to form an acute angle with respect to the first sub area 140.

Figure 12A:
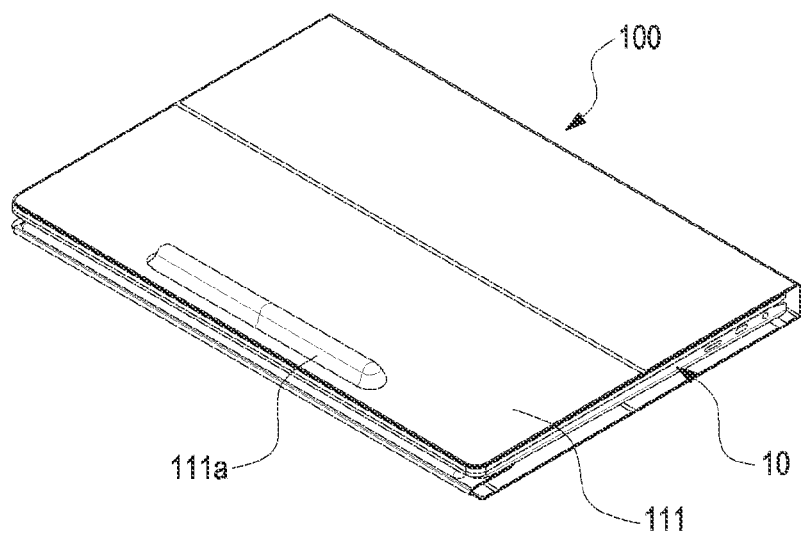
FIG. 12A is a perspective view illustrating a receiving groove of a support cover of an electronic device according to various embodiments.

FIG. 12A is a perspective view illustrating a receiving groove 111a of a support cover 100 of an electronic device 10 according to various embodiments.

Figure 12B:
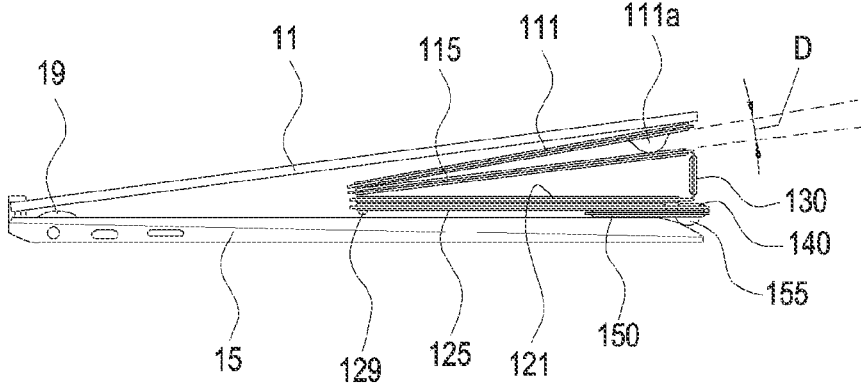
FIG. 12B is a diagram illustrating a side view of a sixth state of a support cover supporting an electronic device according to various embodiments.

FIG. 12B is a diagram illustrating a side view of a ninth state of a support cover 100 supporting an electronic device 10 according to various embodiments.

Figure 13A:
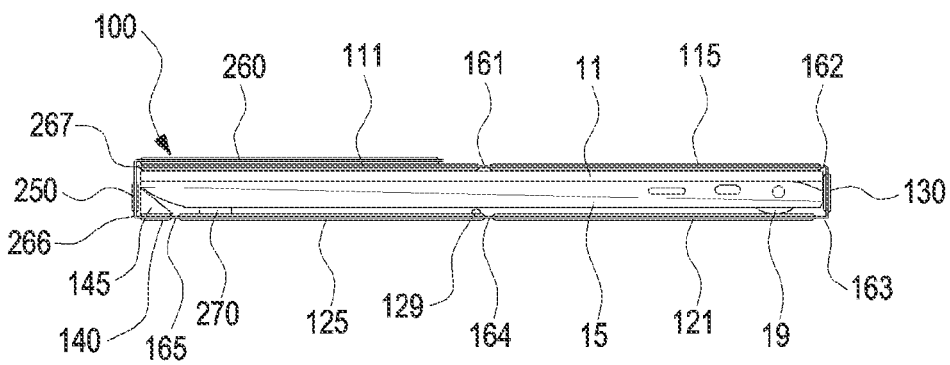
FIG. 13A is a diagram illustrating a side view of a state in which an electronic device and a support cover are coupled according to various embodiments.
Figure 13B:
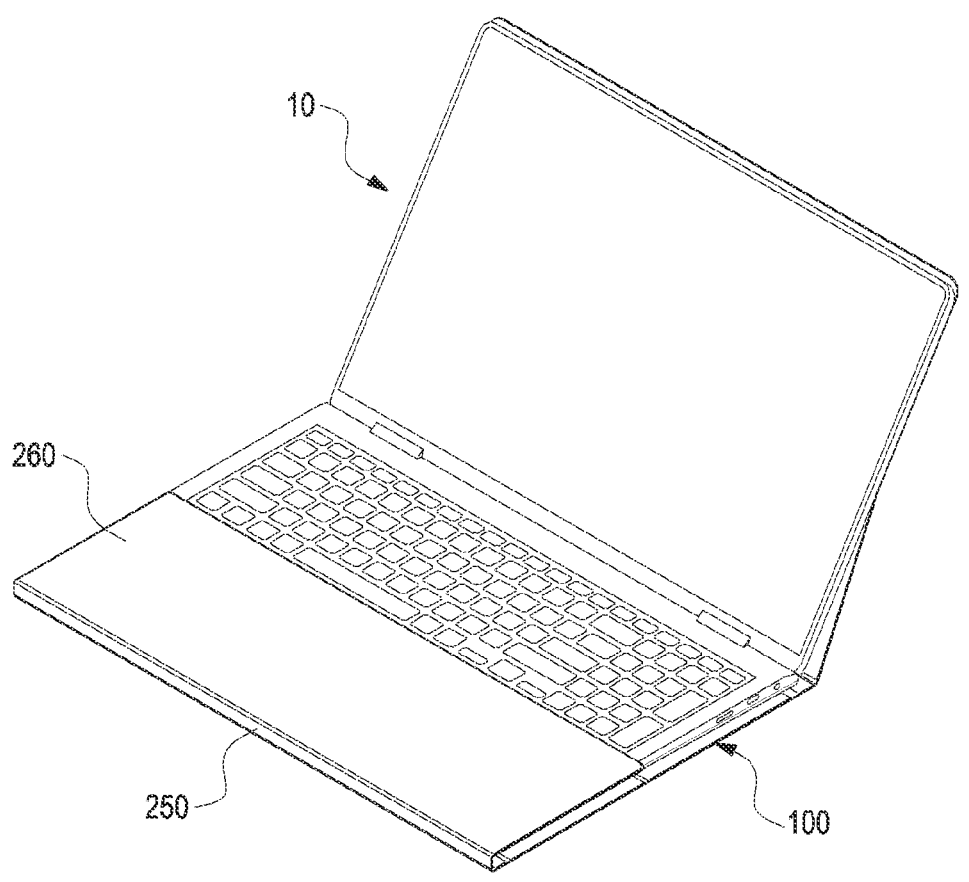
FIG. 13B is a perspective view illustrating a state in which a third sub area of a support cover closes a touch pad of an electronic device according to various embodiments.
Figure 13C:
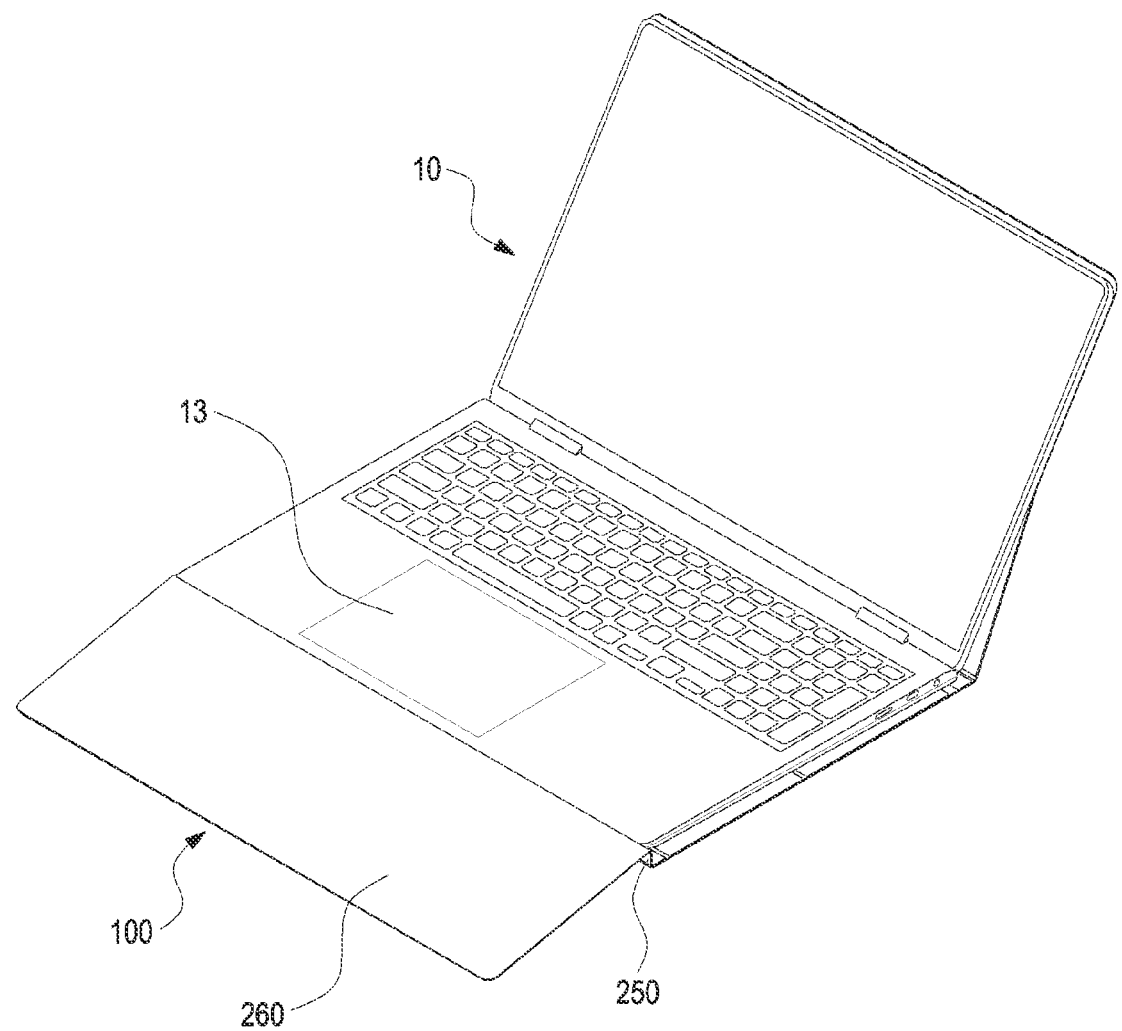
FIG. 13C is a perspective view illustrating a state in which a third sub area of a support cover opens a touch pad of an electronic device according to various embodiments.

Embodiments of FIGS. 12A and 12B may be coupled to embodiments of FIGS. 1A to 11B or embodiments of FIGS. 13A to 13C, but is not limited thereto.

Referring to FIG. 12A, the (1-1)th main area 111 of the support cover 100 may further include are receiving groove 111a. The receiving groove 111a may provide a space for receiving a digital pen (e.g., stylus pen) (or electronic pen) for handwriting input on a display of the electronic device 10. The receiving groove 111a may be a groove concavely configured from the rear surface of the (1-1)th main area 111. In addition, the receiving groove 111a may have a shape protruding from the front surface of the (1-1)th main area 111.

FIG. 12B illustrates a state in which the support cover 100 of the electronic device 10 is disposed in a ninth state. The ninth state of the support cover 100 may be defined as a low angle tablet mode of the support cover 100.

According to an embodiment, the rear surface of the first housing 11 may be supported by at least a part of the (1-1)th main area 111.

According to an embodiment, the (1-2)th main area 115 may be disposed to form a first angle D which is an acute angle with respect to the (1-1)th main area 111. As illustrated, a predetermined gap may be configured between the (1-1)th main area 111 and the (1-2)th main area 115 by the receiving groove 111a, and thus the (1-1)th main area 111 and the (1-2)th main area 115 may be disposed to have the first angle D.

According to an embodiment, the third main area 130 may be disposed to form an acute angle with respect to the (1-2)th main area 115. In addition, the third main area 130 may be disposed to form an acute angle or a right angle with respect to the (2-1)th main area 121.

According to an embodiment, the (2-1)th main area 121 may be supported by the (2-2)th main area 125. In addition, the (2-1)th main area 121 may support the (1-1)th main area 111 and the (1-2)th main area 115.

According to an embodiment, the (2-2)th main area 125 may be disposed to overlap the (2-1)th main area 121. According to an embodiment, the (2-2)th main area 125, the first sub area 140, and the second sub area 150 may be supported by the rear surface of the second housing 15.

FIG. 13A is a diagram illustrating a side view of a state in which an electronic device 10 and a support cover 100 are coupled according to various embodiments.

FIG. 13B is a perspective view illustrating a state in which a third sub area 260 of a support cover 100 closes a touch pad of an electronic device 10 according to various embodiments.

FIG. 13C is a perspective view illustrating a state in which a third sub area 260 of a support cover 100 opens a touch pad of an electronic device 10 according to various embodiments.

Embodiments of FIGS. 13A and 13C may be coupled to embodiments of FIGS. 1A to 12B, but is not limited thereto.

A part or all of a second sub area 250 of FIGS. 13A to 13C may be the same as the second sub area 150 of FIGS. 1A to 12B.

A part or all of at least one connector 270 of FIGS. 13A to 13C may be the same as at least one connector 170 of FIGS. 1A to 12B.

Referring to FIG. 13A, according to an embodiment, the at least one connector 170 may be disposed on the second main area 120. For example, the at least one connector 270 may be disposed on the (2-2)th main area 125.

According to an embodiment, the first sub area 140 may further include a first protrusion portion 145 for preventing and/or reducing a sliding movement of the second housing 15. The first protrusion portion 145 may substantially have a triangular cross-sectional shape, but it is not limited thereto.

According to an embodiment, the second sub area 250 may be connected to be rotatable relative to the first sub area 140 with reference to a sixth rotation axis 266.

According to an embodiment, the support cover 100 may further include a third sub area 260. According to an embodiment, the third sub area 260 may be connected to be rotatable relative to the second sub area 250 with reference to a seventh rotation axis 267.

FIG. 13A illustrates a first state (e.g., pouch mode) of the support cover 100. When the support cover 100 is in a first state, the third sub area 260 may be disposed to cover at least a part of the (1-1)th main area 111. The third sub area 260 may include a plurality of magnetic members. The plurality of magnetic members of the third sub area 260 may form a bonding force with the plurality of magnetic members 113, 114 of the (1-1)th main area 111.

Referring to FIGS. 13B and 13C, a second state (e.g., laptop mode) of the support cover 100 is illustrated. When the support cover 100 is in the second state, the third sub area 260 may rotate with regard to the second sub area 250 to close the touch pad as illustrated in FIG. 13B or to open the touch pad 13 as illustrated in FIG. 13C.

Generally, the electronic device, such as a laptop computer, may be used along with a receiving cover (e.g., pouch) for storing the laptop computer. However, a general receiving cover has inconvenience in that the cover provides only a space for receiving a laptop computer therein and the laptop computer should be separated from the receiving cover when the laptop computer is used.

Lately, a laptop computer having a hinge structure by which a display housing is rotatable 360 degrees relative to a keyboard housing is provided to consumers. The laptop computer having the hinge structure enables a display module disposed in the display housing to include a digitizer capable of detecting input of a digital pen (e.g., stylus pen), thereby providing various use modes.

For example, a laptop computer may be provided as a notebook mode for typing input or may be provided as a tablet PC mode for writing input.

However, a conventional receiving cover merely provides a structure for receiving a laptop computer, but has a problem that it is difficult to use the receiving cover along with the laptop computer in the notebook mode or the tablet PC mode.

According to an embodiment of the disclosure, as a support cover of an electronic device, which can support the laptop computer in various shapes according to various use modes of the laptop computer, may be provided.

The problem to be addressed in the disclosure may not be limited to the above-mentioned problem, and may be variously determined without deviating from the idea and region of the disclosure.

A support cover of an electronic device according to an embodiment of the disclosure has a structure changeable corresponding to the shape of a laptop computer according to a tablet PC mode or a general use mode (e.g., notebook mode) of the laptop computer, and thus can provide a support structure for various use modes through one support cover.

Advantageous effects obtainable from the disclosure are not limited to the above-mentioned advantageous effects, and other advantageous effects not mentioned herein will be clearly understood by those skilled in the art to which the disclosure pertains.

According to an example embodiment of the disclosure, a support cover (e.g., the support cover 100) for an electronic device may include: a first main area (e.g., the first main area 110); a second main area (e.g., the second main area 120) connected to be rotatable relative to the first main area; a first sub area (e.g., the first sub area 140) connected to be rotatable relative to the second main area; a second sub area (e.g., the second sub area 150) connected to be rotatable relative to the first sub area and having a length greater than a length of the first sub area in a first direction; at least one connector (e.g., the at least one connector 170) disposed on the second sub area and configured to be fixed to at least a part of the electronic device; and a first protrusion portion (e.g., the first protrusion portion 155) disposed adjacent to the first sub area and protruding from the second sub area.

According to an example embodiment, the first main area may include: a first first main area (e.g., the first first main area 111); and a second first main area (e.g., the second first main area 115) connected to be rotatable relative to the first first main area and connected to be rotatable relative to the second main area.

According to an example embodiment, the first first main area may include a receiving groove (e.g., the receiving groove 111a) configured to receive a digital pen.

According to an example embodiment, the second main area may include: a first second main area (e.g., the first second main area 121) connected to be rotatable relative to the second first main area; and a second second main area (e.g., the second second main area 125) connected to be rotatable relative to the first second main area and connected to be rotatable relative to the first sub area.

According to an example embodiment, the first first main area may include a plurality of first first magnetic members (e.g., the plurality of first first magnetic members 113, 114) comprising a magnet or magnetic material and the main area may include a plurality of second second magnetic members (e.g., the plurality of second second magnetic members 127, 128) comprising a magnet or magnetic material configured to form a bonding force with the plurality of first first magnetic members.

According to an example embodiment, the second sub area may include a plurality of second sub magnetic members (e.g., the plurality of second sub magnetic members (153, 154) comprising a magnet or magnetic material configured to form a bonding force with the plurality of second second magnetic members.

According to an example embodiment, the first sub area may include a plurality of first sub magnetic members (e.g., the plurality of first sub magnetic members 142) comprising a magnet or magnetic material configured to form a bonding force with the plurality of second sub magnetic members.

According to an example embodiment, the first second main area may include a second protrusion portion (e.g., the second protrusion portion 129) disposed adjacent to the second first main area and protruding from at least a part of the first second main area.

According to an example embodiment, the support cover may further include a third main area disposed between the second first main area and the first second main area.

According to an example embodiment, the third main area may be connected to be rotatable relative to the second first main area and may be connected to be rotatable relative to the first second main area.

According to an example embodiment of the disclosure, a support cover (e.g., the support cover 100) for an electronic device may include: a first main area (e.g., the first main area 110) including a first first main area (e.g., the first first main area 111) and a second first main area (e.g., the second first main area 115) connected to be rotatable relative to the first first main area; a second main area (e.g., the second main area 120) including first second main area (e.g., the first second main area 121) connected to be rotatable relative to the second first main area and a second second main area (e.g., the second second main area 125) connected to be rotatable relative to the first second main area; a first sub area (e.g., the first sub area 140) connected to be rotatable relative to the second second main area; a second sub area (e.g., the second sub area 150) connected to be rotatable relative to the first sub area and including a first protrusion portion (e.g., the first protrusion portion 155) protruding from at least a part thereof; and at least one connector (e.g., the at least one connector 170) disposed on the second sub area and configured to be fixed to at least a part of the electronic device.

According to an example embodiment, the first first main area may include a plurality of first first magnetic members (e.g., the plurality of first first magnetic members 113, 114) comprising a magnet or magnetic material, and the second main area may include a plurality of second second magnetic members (e.g., the plurality of second second magnetic members 127, 128) comprising a magnet or magnetic material configured to form a bonding force with the plurality of first first magnetic members.

According to an example embodiment, the second sub area may include a plurality of second sub magnetic members (e.g., the plurality of second sub magnetic members 153, 154) comprising a magnet or magnetic material configured to form a bonding force with the plurality of second second magnetic members.

According to an example embodiment, the support cover may include a plurality of first sub magnetic members (e.g., the plurality of first sub magnetic members 142) comprising a magnet or magnetic material configured to form a bonding force with the plurality of second sub magnetic members.

According to an example embodiment, the support cover may further include a third main area (e.g., the third main area 130) disposed between the second first main area and the first second main area, wherein the third main area is connected to be rotatable relative to the second first main area and connected to be rotatable relative to the first second main area.

According to an example embodiment, the at least one connector and the first protrusion portion may be disposed on the same surface of the second sub area.

According to an example embodiment, the second second main area may include a second protrusion portion (e.g., the second protrusion portion 129) protruding from at least a part of the second second main area, and the first protrusion portion and the second protrusion portion may be disposed in opposite directions in state in which the support cover is completely unfolded.

According to an example embodiment of the disclosure, a support cover (e.g., the support cover 100) for an electronic device may include: a first main area (e.g., the first main area 110) including a first first main area (e.g., the first first main area 111) and a second first main area (e.g., the second first main area 115) connected to be rotatable relative to the first first main area; a second main area (e.g., the second main area 120) including a first second main area (e.g., the first second main area) connected to be rotatable relative to the second first main area and a second second main area (e.g., the second second main area 125) connected to be rotatable relative to the first second main area; a first sub area (e.g., the first sub area 140) connected to be rotatable relative to the second second main area and including a first protrusion portion (e.g., the first protrusion portion 145) protruding from at least a part thereof; a second sub area (e.g., the second sub area 250) connected to be rotatable relative to the first sub area; and a third sub area (e.g., the third sub area 260) connected to be rotatable relative to the second sub area.

According to an example embodiment, the support cover may further include at least one connector (e.g., the at least one connector 270) disposed on the second second main area and configured to be fixed to at least a part of the electronic device.

According to an example embodiment, the second second main area may further include a second protrusion portion (e.g., the second protrusion portion 129) protruding from at least a part of the second second main area.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A support cover for an electronic device, the support cover comprising:
   a first main area;
   a second main area connected to be rotatable relative to the first main area;
   a first sub area connected to be rotatable relative to the second main area;
   a second sub area connected to be rotatable relative to the first sub area with reference to a rotation axis extending in a first direction and having a length greater than a length of the first sub area in a second direction perpendicular to the first direction;
   at least one connector disposed on the second sub area and configured to be fixed to at least a part of the electronic device; and a first protrusion portion disposed adjacent to the first sub area and protruding from the second sub area.

2. The support cover of claim 1, wherein the first main area comprises:
   a first first main area; and
   a second first main area connected to be rotatable relative to the first first main area and connected to be rotatable relative to the second main area.

3. The support cover of claim 2, wherein the first first main area comprises a receiving groove configured to receive a digital pen.

4. The support cover of claim 2, wherein the second main area comprises:
   a first second main area connected to be rotatable relative to the second first main area; and
   a second second main area connected to be rotatable relative to the first second main area and connected to be rotatable relative to the first sub area.

5. The support cover of claim 4, wherein the first first main area comprises a plurality of first first magnetic members comprising a magnet or a magnetic material, and
   the second second main area comprises a plurality of second second magnetic members comprising a magnet or a magnetic material configured to form a bonding force with the plurality of first first magnetic members.

6. The support cover of claim 5, wherein the second sub area comprises a plurality of second sub magnetic members comprising a magnet or a magnetic material configured to form a bonding force with the plurality of second second magnetic members.

7. The support cover of claim 6, wherein the first sub area comprises a plurality of first sub magnetic members configured to form a bonding force with the plurality of second sub magnetic members.

8. The support cover of claim 4, wherein the first second main area comprises a second protrusion portion disposed adjacent to the second first main area and protruding from at least a part of the first second main area.

9. The support cover of claim 4, further comprising a third main area disposed between the second first main area and the first second main area.

10. The support cover of claim 9, wherein the third main area is connected to be rotatable relative to the second first main area and connected to be rotatable relative to the first second main area.

11. The support cover of claim 1, wherein
   the at least one connector is disposed on a surface of the second sub area and is configured to be connected to the at least a part of the electronic device, and
   the first protrusion portion is disposed on the surface of the second sub area and is configured to support at least a part of the electronic device.

12. The support cover of claim 1, wherein
   the at least one connector is disposed on a surface of the second sub area and extends in a second direction perpendicular to the first direction and the at least one connector is configured to be connected to at least a part of the electronic device, and
   the first protrusion portion is disposed on the surface of the second sub area adjacent to the first sub area, protrudes in the second direction from the second sub area, and is configured to support at least a part of the electronic device.

13. A support cover for an electronic device, the support cover comprising:

a first main area including first first main area and a second first main area connected to be rotatable relative to the first first main area;

a second main area including a first second main area connected to be rotatable relative to the second first main area and a second second main area connected to be rotatable relative to the first second main area;

a first sub area connected to be rotatable relative to the second second main area;

a second sub area connected to be rotatable relative to the first sub area and including a first protrusion portion protruding from at least a part thereof; and at least one connector disposed on the second sub area and configured to be fixed to at least a part of the electronic device.

14. The support cover of claim 13, wherein the first first main area comprises a plurality of first first magnetic members comprising a magnet or a magnetic material, and the second second main area comprises a plurality of second second magnetic members comprising a magnet or a magnetic material configured to form a bonding force with the plurality of first first magnetic members.

15. The support cover of claim 14, wherein the second sub area comprises a plurality of second sub magnetic members comprising a magnet or a magnetic material configured to form a bonding force with the plurality of second second magnetic members.

16. The support cover of claim 15, wherein the first sub area comprises a plurality of first sub magnetic members comprising a magnet or a magnetic material configured to form a bonding force with the plurality of second sub magnetic members.

17. The support cover of claim 13, further comprising a third main area disposed between the second first main area and the first second main area, wherein the third main area is connected to be rotatable relative to the second first main area and connected to be rotatable relative to the first second main area.

18. The support cover of claim 13, wherein the at least one connector and the first protrusion portion are disposed on the same surface of the second sub area.

19. The support cover of claim 13, wherein the second second main area comprises a second protrusion portion protruding from at least a part of the second second main area, and the first protrusion portion and the second protrusion portion are disposed in opposite directions in state in which the support cover is completely unfolded.

* * * * *